(12) United States Patent
Bosshart et al.

(10) Patent No.: US 9,998,574 B2
(45) Date of Patent: *Jun. 12, 2018

(54) PACKET PROCESSING MATCH AND ACTION UNIT WITH CONFIGURABLE BIT ALLOCATION

(71) Applicant: TEXAS INSTRUMENTS INCORPORATED, Dallas, TX (US)

(72) Inventors: Patrick W. Bosshart, Plano, TX (US); Hun-Seok Kim, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/788,179

(22) Filed: Oct. 19, 2017

(65) Prior Publication Data

US 2018/0041615 A1    Feb. 8, 2018

Related U.S. Application Data

(63) Continuation of application No. 14/193,190, filed on Feb. 28, 2014, now Pat. No. 9,826,067.

(60) Provisional application No. 61/770,936, filed on Feb. 28, 2013.

(51) Int. Cl.
  *H04L 12/701*  (2013.01)
  *H04L 29/06*   (2006.01)
  *H04L 12/741*  (2013.01)

(52) U.S. Cl.
  CPC .............. *H04L 69/22* (2013.01); *H04L 45/74* (2013.01); *H04L 45/00* (2013.01)

(58) Field of Classification Search
  None
  See application file for complete search history.

(56) References Cited

U.S. PATENT DOCUMENTS 8,125,991 B1    2/2012  Schlansker et al.
2008/0034267 A1 2/2008  Hou et al.

OTHER PUBLICATIONS

Nick Parlante Memory and Pointer, Essentials of C.*
OpenFlow Specification version 1.1.0 Feb. 2011.*
OpenFlow Switch Specification Verstion 1.1.0, Feb. 28, 2011, pp. 3-22.
Nick Parlante, "Pointers and Memory" 1998-2000.
Nick Parlante, "Essential C" 1998-2000.

* cited by examiner

*Primary Examiner* — Hassan Phillips
*Assistant Examiner* — Ayanah George
(74) *Attorney, Agent, or Firm* — John R. Pessetto; Charles A. Brill; Frank D. Cimino

(57) ABSTRACT

A packet processing block. The block has an input for receiving data in a packet header vector, the vector comprising data representing information for a packet and a match unit for performing match operations between packet header vector data and at least one match table. Various embodiments provide advantages in connection with storing certain action or next table bits outside of the match table, or constants in the table, or by forming the match table from multiple unit match table memories.

9 Claims, 6 Drawing Sheets

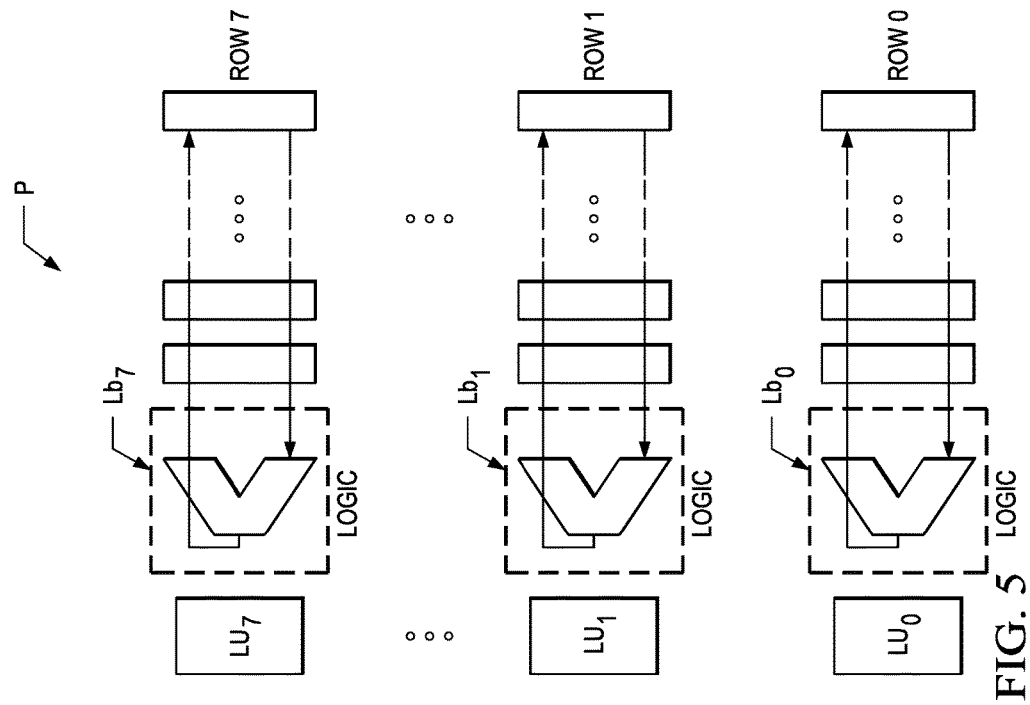
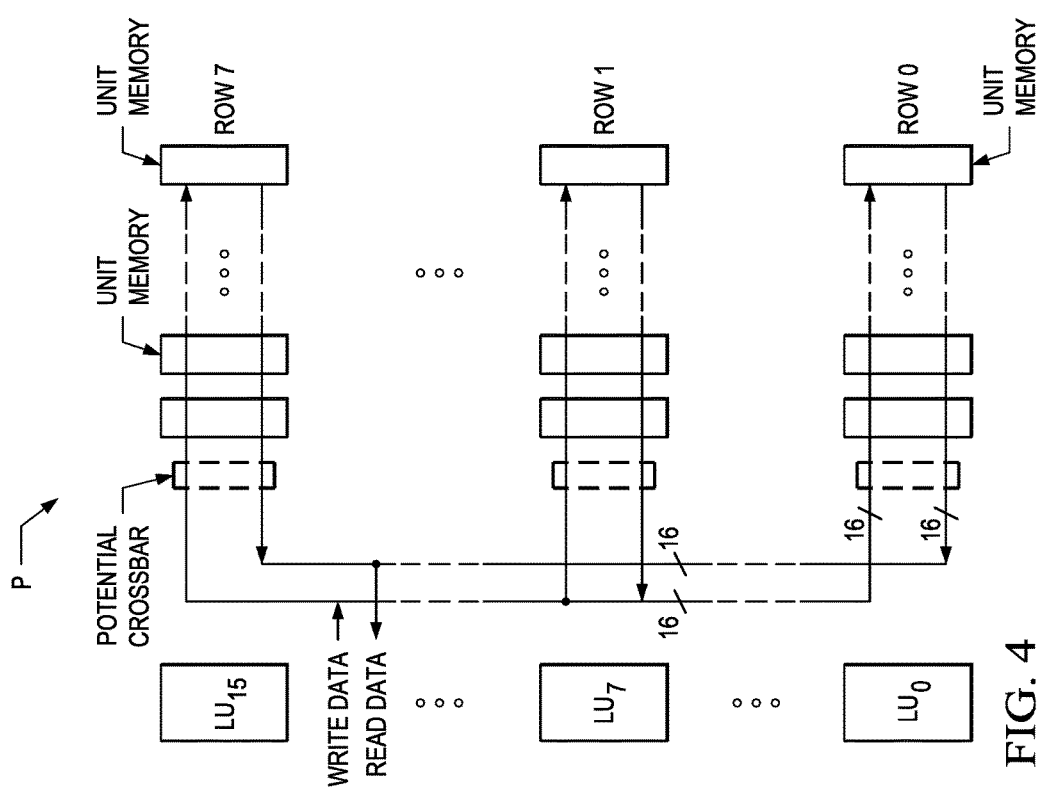

PACKET PROCESSING MATCH AND ACTION UNIT WITH CONFIGURABLE BIT ALLOCATION

CROSS-REFERENCES TO RELATED APPLICATIONS

This continuation application claims priority to U.S. patent application Ser. No. 14/193,190, filed Feb. 28, 2014, which application claims priority to and the benefit of Provisional Patent Application No. 61/770,936, filed Feb. 28, 2013, both applications of which are incorporated herein by reference in their entirety.

STATEMENT REGARDING FEDERALLY SPONSORED RESEARCH OR DEVELOPMENT

Not Applicable.

BACKGROUND OF THE INVENTION

By way of background, the preferred embodiments related to network packet switching, and have relevance by way of example in a match action paradigm, such as what is known as OpenFlow, which is an evolving networking standard. OpenFlow in its original as well as current form is defined by a specification that originates with the concept of adding some level of architecture and protocol to existing and new network hardware so that network innovation may be explored with experimental packets, while such hardware continues also to serve "production" packets, that is, ongoing regular network communications to serve the regular network users. An additional OpenFlow endeavor is to overlay its implementation onto existing and newly developed hardware to allow the hardware manufacturers to continue to have their own proprietary structures and methodologies, while also providing the OpenFlow implementation so that features can be developed, and potentially added, to such proprietary hardware.

Given the preceding, OpenFlow presents a potentially promising and evolving architecture and protocol that may facilitate numerous developments in networking. The present inventors, however, have identified numerous limitations and potential improvements, as are further detailed below.

BRIEF SUMMARY OF THE INVENTION

In one preferred embodiment, there is a packet processing block. The block comprises an input for receiving data in a packet header vector, the vector comprising data representing information for a packet. The block further comprises a match unit comprising at least one match table and for performing match operations between packet header vector data and the at least one match table. The match table comprises a plurality of match entries, wherein each of the match entries comprises an action memory pointer information field of variable bit width. The block further comprises an action memory and circuitry, responsive to the match operations, for performing actions that comprise modifying the packet header vector data, the actions requiring information in the action memory, wherein the action memory is addressed by an action memory pointer comprising a plurality of bits having an action memory pointer bit width. The block also comprises a global action pointer storage for storing a global action memory pointer, separate from the match table, and a global action boundary store for describing boundaries of a contiguous set of bits of the action memory pointer to be sourced from the action memory pointer information field. The variable bit width of the action memory pointer information field may be a maximum of the action memory pointer bit width bits wide and it may be a minimum of zero bits wide. The contiguous set of bits of the action memory pointer are sourced from the action memory pointer information field, and bits other than the contiguous set of bits of the action memory pointer are sourced from the global action memory pointer.

Numerous other inventive aspects and embodiments are also disclosed and claimed.

BRIEF DESCRIPTION OF THE SEVERAL VIEWS OF THE DRAWING

FIG. 4 illustrates a wiring cost between a crossbar approach and an improved preferred embodiment approach, for communications between logic units and the with pool P of unit memories.

FIG. 5 shows an arrangement of a pool P array of unit memories used for statistics, where a logic block $LB_x$ is placed in each row.

DETAILED DESCRIPTION OF EMBODIMENTS

Figure 1:
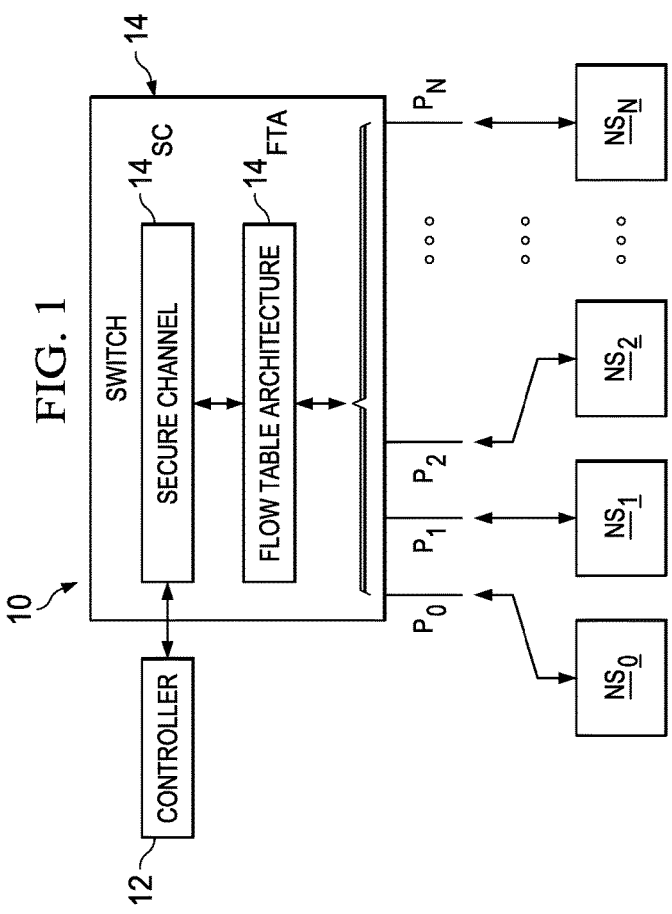
FIG. 1 illustrates a block diagram of an OpenFlow system 10, that in certain forms represents OpenFlow

FIG. 1 illustrates a block diagram of an OpenFlow system 10, that in certain forms represents OpenFlow, both as originated and in its current form, although aspects therein are also improved as will be appreciated by one skilled in the art through the remainder of this document. System 10 includes a controller 12 and a switch 14, with a messaging protocol between the two, as shown by a secure channel $14_{SC}$ in switch 14. Switch 14, for example, may be a typical Ethernet packet processing switch, and controller 12, for example, may be a personal computer, server, or workstation. Switch 14 includes a number of ports, shown as N+1 ports $P_0$ through $P_N$, where, for example, N may be 63. Each port may be coupled to a respective network station $NS_x$, as may be another computing or communications device.

In general, network packets are routed to, processed by, and routed from the OpenFlow switch 14. Further, in connection with OpenFlow, switch 14 forwards some or all packets in packet traffic according to one or more tables, sometimes referred to as flow tables, that are included in a flow table architecture $14_{FTA}$. As further appreciated herein, flow table architecture $14_{FTA}$ includes memory that serves as flow tables, as well as supporting and related circuitry. Finally, while not shown or discussed, switch 14 also may serve various packet functions and routing according to the switch manufacturer, so as to service ordinary or production packet traffic.

Figure 2:
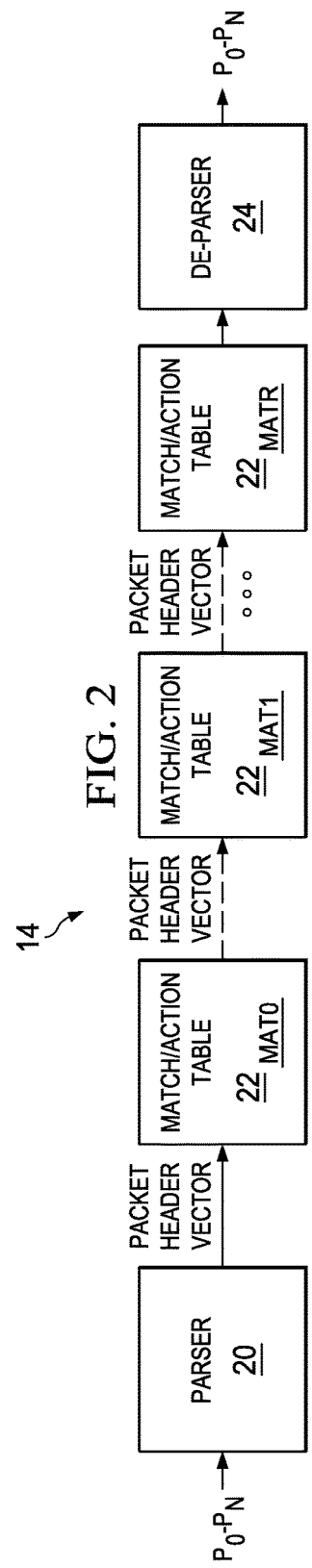
FIG. 2 illustrates a block diagram of further salient aspects of switch 14 from FIG. 1.

FIG. 2 illustrates a block diagram of further salient aspects of switch 14 from FIG. 1. Each of ports $P_0$ through $P_N$ is connected to a parser 20, which in general may select from any of various fields within the packet and align the information from the selected fields to create a packet header vector. In this regard, one or more fields is desirably selected based and coupled to a first match/action table $22_{MAT0}$. As its name suggests and as further detailed below, match/action table $22_{MAT0}$ receives the packet header vector and determines if the vector matches any content row within the table and if so, an action is taken. The original OpenFlow 1.0 specified only a single table; however, FIG. 2 illustrates a total of R−1 potential tables, as later versions of the OpenFlow specification has permitted. Thus, after one action is taken, a packet header vector is submitted sequentially to another corresponding table to determine, again, if there is a match, and if so, the corresponding action is taken. Note that this packet header vector, submitted to another table, is created from the output of the first match/action table and is an identical copy of the packet header vector inputting to that table, or portions of the packet header vector can be modified by the previous action, changing some of the words of the packet header vector. A different action option allows selected modifications to be postponed until after all match stages are executed. A flow entry match also specifies the address of the next table to be executed as a forward-only branch. Eventually, after all tables are consulted in this manner, the fields are presented to a de-parser 24, which realigns the fields into a packet, which is then output to the appropriate one of ports $P_0$ through $P_N$. Lastly, note that FIG. 2 is not intended to be exhaustive in its illustration of switch 14, as other aspects are known by one skilled in the art to be included. For example, typically such a switch includes multiplexers, de-multiplexers, and buffers/queues, so as to receive and distribute packets, and also to accumulate packets and timely distribute them when packets are to be output to a same port that is already schedule for outputting a number of already-waiting packets.

Looking in more detail to the nature of the match/action paradigm for each match/action table $22_{MATx}$, a flow table has rows, where the OpenFlow vocabulary sometimes refer to each row as a separate "flow," that is, the row defines both criteria with which a packet header vector may match and something to occur for a packet that matches that row's criteria. More particularly, the OpenFlow switch 14 processes each packet by comparing information in the packet against each flow table row to determine if such information matches information in the row; if a match is found, then the row table also specifies an "action," to be taken with respect to the matching packet. The separate controller 12 (see FIG. 1) operates, via the OpenFlow protocol and secure channel $14_{SC}$, to communicate commands to switch 14 so as to modify the flow table(s). Additionally, if a packet is received by switch 14 and has no match to a flow table row, then switch 14 may drop the packet or route the packet (possibly encapsulating it in the process) to controller 12, where controller 12 may then communicate back to switch 14 so as to modify the flow table to have a row that will then match to the packet, or controller 12 may merely drop the packet from traffic.

In still greater detail, the OpenFlow switch flow tables contain flow entries, each having ternary values for a selected set of packet header fields (i.e., for a packet header vector). For each packet header vector to be analyzed by switch 14 under OpenFlow, table flow entries in a given table are searched in order (e.g., top address down), with the first matching entry returned. OpenFlow defines a set of recognized packet header fields, and one or more of which may be selected to form the packet header vector, including the commonly used MAC source and destination addresses, ethertype, IP source and destination addresses, IP protocol, TCP port numbers, VLAN and MPLS tags, etc., in addition to user defined extensible fields, and a metadata field to hold non-packet information. The input port ID is also provided as a match input.

The OpenFlow table is a content associative memory, that is, if the content is matched, the location at which the match occurs is reported or provided; in OpenFlow, this location therefore defines the corresponding action to be taken, typically by pointing to an address in an action memory that corresponds to the flow table just searched. Thus, OpenFlow actions, again associated with a packet that matches a flow table entry, are generally one or more instructions to perform various operations for the packet that matched the flow table row. The actions include setting values into any of the packet header's recognized fields, pushing and popping VLAN and MPLS tags, performing PBB encapsulations and decapsulations, miscellaneous operations such as modifying packet TTL or QOS. Actions can also include assigning the packet to an output port and queue, sending the packet to controller 12, or dropping it. With OpenFlow still a new and evolving standard, it is anticipated that implementers will create user defined extensions for any required capabilities not yet in the standard, such as other encapsulation types (GRE, NVGRE, VXLAN, etc.).

OpenFlow actions also may be accomplished by a "group" identifier, providing a way to direct a same set of actions for multiple flows. The group is a type of action, defined as a collection of buckets, where each bucket contains actions, in addition to optionally recursively containing other groups. Such actions provide for multicasting and ECMP. OpenFlow ALL groups implement multicast by executing all buckets, each on a different copy of the packet. OpenFlow SELECT groups execute one randomly selected bucket, implementing ECMP, equal cost multipath, and with optional weights attached to each bucket, uECMP, unequal cost multipath. The random selection is typically done by hashing on a selected set of packet headers, so that different flows are routed to different buckets, but all packets from the same flow receive identical treatment. Fast failover groups execute the first bucket associated with a live output port, allowing quick reaction to link failures. OpenFlow indirect groups contain a single bucket, and are useful simply as a layer of indirection.

OpenFlow also defines "meters," which are a type of action executable on a flow table match used to measure data flow rates. A meter includes a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. Meter bands are often informally named with colors, such as green, yellow and red for a three color meter. Openflow provides for remarking the packet DSCP field as a result of overflowing the base band. This information might be used later to direct the packet to a different queue, where it may be more subject to delay or dropping in case of congestion.

OpenFlow also defines "statistics," which are another type of action that provides collecting counters. These counters may count various items, including packet and byte counters, for flow tables, flow table entries, groups and group buckets, meters and meter bands, input/output ports, and queues. While most statistics are optional, the information they provide is useful to implementers.

Having introduced various aspects of a data flow, recall that the OpenFlow switch 14 and controller 12 communicate with one another through a messaging protocol, established by the standard. This protocol therefore facilitates and works with the above-introduced aspects. Some examples are now listed. Messages provide for initial configuration, set up, modification, or deletion of flow table, group and meter entries. Statistics information can be requested by the controller and communicated back by the switch. Flow entries can, as an action, direct a packet to be sent to controller 12, and controller 12 can send packets back to switch 14 for OpenFlow processing. As mentioned earlier, if a packet is unexpectedly unmatched in a flow table, the packet is sent via the messaging protocol to controller 12, which responds by installing flows into one or more switches. This implements the software-defined networking (SDN) canonical separation of data plane and control plane processing; switch functionality, as the former, is confined to matching flows and taking the indicated actions, while any unrecognized pattern is sent up to the controller which, as the latter, shoulders the responsibility for all high level decisions.

In some aspects of preferred embodiments, improvements are provided in OpenFlow flow table architecture $14_{FT4}$, and to facilitate an understanding thereof, a continuing description is now provided of the high level design of a match stage, that is, a unit that can be cascaded to implement the core of OpenFlow switch functionality: providing the flow tables, matching of packet fields against flow table entries, taking the actions indicated by the match, and collecting statistics, which may be perceived as a type of action but also involve modifying a value beyond one in the packet header vector. U.S. patent application Ser. No. 14/072,989, entitled "An Openflow Match and Action Pipeline Structure," filed Nov. 6, 2013, provides additional background material in this area by describing additional aspects of a match stage implementation, and it is hereby incorporated herein by reference. Further, by way of example, an implementation to be described targets a 64 port by 10 Gbit/s switch, which produces a maximum packet rate of 960M packets/s. If a match stage pipeline is run at 1 GHz or slightly less, each packet therefore has a single clock cycle to flow through the pipe.

In the OpenFlow switch 14, parser 20 accepts the incoming packet data and produces a packet header vector (e.g., 4 k bit) as its output, with each defined header field in a fixed, though configurable, position. This 4 k bit vector, therefore, is properly aligned so as to provide the input data to the match pipeline of match units. The 4 k bit packet header vector is composed of a number of 8, 16, and 32 bit fields, each of which has an associated valid bit.

OpenFlow defines all tables with ternary matching capability; that is, each table bit can have the ternary values of 0, 1 or don't-care. Wildcarding bits allow a wide variety of packets to match a single table entry. At a performance level targeted of one packet per clock cycle, ternary match tables are implemented with ternary content addressable memory (TCAM) modules. Another useful type of table is an exact match table, where no wildcarding is allowed, and packets must exactly match table entries. As further detailed below, these can be implemented in SRAM, with the advantage that an SRAM is significantly less area, around six to seven times, than a TCAM table of equivalent bitcount, as may be expected given the additional logic required of the TCAM and the wildcarding and ternary aspects.

As introduced above, exact match tables may be implemented by using SRAMs, and note now the implementations are as hashtables. Generally, hashing involves reducing the number of bits preliminary searched, by creating a smaller quantity of bits (i.e., the "hash") from the larger number of searchable bits, so as to reduce the search effort from having to search line-by-line and bit-by-bit in each table row. Thus, a hashtable takes some or all of the input bits of a search word, and generates a pseudorandom, but predictable, number from those bits. One method of hashing generates an N-bit address from an M-bit input, where for each of the N-hash output bits, a separate M-bit mask is logically AND'ed with the input data, then the parity of the result is taken. The input bit mask for each hash output bit is different, and there are methods known in the art to select masks with desirable properties. This method is equivalent to the mathematical operation of a Galois Field multiplication. There are multiple methods of generating hash addresses known in the art, but all of them attempt to generate an address, where for all data inputs, the addresses end up uniformly distributed across the N-bit address space, so that hashtable entries are evenly spread out over all words of the SRAMs used for hashtable data storage. Hash tables operate by accessing an array of data at that hashed location, and checking to determine whether the accessed data is the desired data. This check is performed by doing a comparison between the desired data and accessed data to determine their equality. Hash tables also have to contend with the possibility of address collisions, where multiple distinct inputs hash to the same address. There are many techniques known in the art for accomplishing this. Multiway hashing handles this by making K hash addresses instead of one, and looking up the data in those K separate locations in K individual arrays. When an entry is to be added, this multiway hashtables provide several possible locations, all equally good, increasing the probability that one of the locations will be empty.

A further refinement implementing exact match tables uses Cuckoo hash tables, which are multiway hash tables distinguished by a fill algorithm providing high hashtable occupancy. When adding an entry, if all possible locations for that entry are full, since all current occupants also have other choices for their locations, one of them can be evicted to an alternative location, possibly resulting in a chain of evictions and continuing until an entry is placed in an empty location. Cuckoo hash tables routinely achieve high efficiencies, for example, above 95% occupancy for 4-way hashtables. Reads are deterministically performed in one cycle, with all ways accessed in parallel. While all of this is known art, the present inventors have recognized that an essential element to implement OpenFlow exact match tables is the use of multiway hash tables, where a number (preferably at least four) of separate SRAM modules each compute individual hash keys and determine whether the search data exists at the computed hash location. So a number of SRAM modules must be used. In one preferred embodiment, therefore, tables are formed by selecting a number of unit memories to form each table, where a unit memory in such a preferred embodiment is a 1 k SRAM as further described later, so that table may be made deeper (i.e., increasing number of words in a table) by incorporating additional unit memories, with each unit memory either adding another way to the hash table or incrementing the number of items contained in an individual way. If multiple items are contained in an individual way, an address lookup yields multiple entries, any of which when compared may turn out to be the desired data. Alternatively, this can be viewed as a multi-bank hashtable where some of the banks use the same hashed address, so the number of hash keys is less than the number of banks.

Also in connection with the preferred embodiment, the present inventors observe that the packet header vector (i.e., match data) input to match tables may vary significantly in width, from single fields to hundreds of bits. For example, a maximum match width may be 640 bits. Thus, rather than an implementation requiring a memory that is 640 bits wide, in a preferred embodiment narrower widths can be accommodated by breaking the 640b match memory into separate unit memories, for example eight unit memories with 80 bits of width each, thereby logically concatenating the eight units to provide a total of 640 bits (i.e., 8×80b=640b). Then these eight unit memories may be combined to make an eight times deeper table (with eight times the number of entries) or may instead create eight separate tables. Thus, unit memories may be concatenated in groups, for example two unit memories wide for 160 bits (i.e., two units*80 bit width/unit=160 bits), and of course other width combinations may be ascertained by one skilled in the art. If four ways are required in the exact match table of a match stage, this results in an array of 8×4 memory units, each of which can match 80 bit wide data, whereby 8×4 provides four ways of a 640 bit match, or four ways of eight separate tables each matching 80b, etc. The 80 bits of match per unit memory is an approximation, as will be explained in more detail further below. Each memory is 1 k words deep in this example.

Ternary matches using TCAM are also configured to match wide or narrow entries, with a 640b wide memory split into eight 80 bit units, which like the SRAM exact match memory, may be used to create narrow deeper memories, or separate memories, or combined in groups as desired. Given the six to seven times larger area of TCAM versus SRAM, less of it is typically provided than exact match memory, for example, ½ or ¼. The TCAM also could be divided into a different number of units, for example into sixteen 40 bit units.

When either a ternary or exact match is found, it provides several pointers that together contain the required information to perform the desired actions. These include an instruction memory address (for the instruction that performs an action), an action memory address and size (in some instances for the data on which the instruction operates), and a next table address. Actions are performed by modifying fields of the 4 k bit packet header vector. There are 64, 96, and 64 words of 8, 16, and 32b respectively in the packet header vector, with an associated valid bit for each. The action engine uses a VLIW architecture, where each of these words has its own functional unit to compute updated values. The units of smaller words can be combined to execute a larger field instruction, for example, two 8b units can merge to operate on their data as a single 16b field. There is a VLIW instruction memory, with individual instruction fields, for each of these words.

OpenFlow specifies simple actions, such as setting a field to a value, as well as complex operations, such as provider backbone bridge (PBB) encapsulate, or inner-to-outer or outer-to-inner TTL copies, where the outer and inner fields may be one of a number of choices. Complex operations can be decomposed into multiple actions on separate fields, but complex modifications to each individual field become more difficult as the data line rate increases. These complex modifications can be subroutines at low speeds, but must be flattened into single-cycle operations at the packet per clock cycle rate of this device. It is essential to provide action capabilities powerful enough to handle the expected types of operations. A general set of conditionalized arithmetic, logical, multiplexing, and bit field manipulation capabilities is provided. Since the chip area of the action engine is dominated by selecting source operands (action data and packet header words) rather than by computation, flexible action capabilities come at relatively low cost.

Action operations may get their sources from packet header fields, or from an action memory. An action indicated by a match may be simple and require only a small amount of data from action memory, or complex and require a large amount of data. Action memory is 640b wide, and may be output in an "action size" of 1, ½, ¼, ⅛, or 1/16 of that full width, that is, the size effectively defines a number of the total 640 bits required to express or effect an action. Hence, action memory is accessed by providing a size and an aligned pointer. Action memory is separate from instruction memory in the same way that instructions and data are separate entities in a processor. For example, a common action of an IP router is to decrement the IP TTL field, set the MAC source and destination addresses, and set the switch output port and queue. These individual modifications to the various affected fields are all grouped together into a single VLIW instruction, where the various needed constants, like subroutine arguments, are in specific places in the delivered action word. While each match entry may require an individual action word for the data constants, they may all reference the same VLIW instruction word. The number of required instruction words is considerably less than the number of required action words.

In addition to the action size and address and the instruction address, a next table address is provided as a result of a match. The 4 bit action size (to specify from 1× to 1/16× size) and 13 to 17 bit action address (to allow a range of from 8 K 640b entries to 128 k 40b entries) can be combined into a single 18b entry as shown in the following Table 1:

TABLE 1

| (action memory address and size coding) | |
|---|---|
| wwww00000; 1x | 13 b address |
| wwwwf1000; 1/2x | 13 b address |
| wwwwff100; 1/4x | 13 b address |
| wwwwfff10; 1/8x | 13 b address |
| wwwwffff1; 1/16x | 13 b address |

In Table 1, "w" specifies a bit of the word (640b) address and "f" specifies an address of a fractional portion of that 640b. As will be seen later, with a maximum of 16 individual tables in a stage and 32 stages, 9 bits are required for a next table address. With an instruction memory of 32 VLIW words per stage, 5 bits are required for instruction address. If all of these fields are contained in extra bits of the match memory, this totals to 32 bits of overhead. There are 4 valid bits that together provide both valid and rule version information. There are also 4 field-valid bits. The match data is composed of 8, 16, and 32b words from the packet header vector. The 4 field-valid bits allows the rule to check field presence or absence of each individual field. 8 ECC bits are also provided. This totals 48 bits of overhead including ECC. Thus, with a 112b wide preferred embodiment unit memory, using 48 of those bits for overhead, the remaining 64 bits are provided for match data in a single one of those unit memories, with this detailed explanation showing that less than the 80 bits described above as a general explanation are actually available for matching. When two of the preferred embodiment unit memories are combined for a wider word, the overhead bits are paid once over a larger width, yielding 168 bits of match data width (with 11 field valid bits; detailed later in Table 3). In all cases of appending two or more unit memories, the match width is greater than N×80 bits for N units.

In a preferred embodiment, there are several other mechanisms for reducing overhead bits, which result in allowing wider match data fields or more entries. These will be explained later. But for now, it also may be pointed out that in a preferred embodiment all three overhead fields need not always be contained as overhead fields in the match data word. It is possible for the action instruction address and next table address to be contained as fields in the action word instead. Putting these as overhead fields in the action word may reduce total memory bitcount if many match locations point to a single action word; in that case the instruction and next-table fields are stored once (in an action table) rather than many times (for each match data word). However, the availability of that information is moved backward in time, which may have performance effects by increasing latency. Likewise, there may be other reasons to keep the instruction and next-table address in the match memory. Some action operations may not require any action data. For example, invalidating or moving fields do not require the inputting of any constants.

Out of the above described 8 k words of action memory address space, if one action word is provided for each match word, an array of 4 deep by 8 wide action memories is required for exact matches, and another 2 deep by 8 wide for ternary matches, assuming ternary matches have half the capacity of exact matches. Action memories are 1 k words deep in this example.

It is recognized that different use cases will require differing ratios of action memory to match memory. For example, if match memory is full width with 8 unit memories concatenated, the match stage contains ⅛ the number of flow entries versus the case when the match tables are one unit memory wide. The amount of action memory may be expected to vary by eight times in those two cases.

Given the preceding, the present inventors have recognized that for both match and action memories, a considerable amount of flexibility is demanded in dimensions and size. Accordingly, in an inventive preferred embodiment, a switch 14 (e.g., FIG. 1) includes a pool, preferably arranged in an array, of what have been above and are hereafter referred to as unit memories, that is, a number of memories, where preferably each unit memory is of a same size (e.g., 112 bits by 1 k words). The unit memories may be constructed by techniques known or ascertainable to one skilled in the art, where a contemporary example would be for each unit memory to be an SRAM as is very common for the form of on-chip memory in the art. Further per a preferred embodiment, switch 114 may allocate from among the unit memory pool, for example, allocating a first number of unit memories for use as match memory and a second number of unit memories for use as action memory. Thus, the prior art includes fixed size memories for things such as match, action, and others, and the present inventors have recognized therefore that in various, if not many, instances, some of that memory goes unused based on match or action issues. In contrast, a preferred embodiment provides the memory pool so as to flexibly apportion unit memories to more efficiently use them for either match or action memory. In additional preferred embodiments, and as shown later, the inventive memory pool extends to including statistics and meters memories, in addition to what will be referred to as "stateful" memories so as to accommodate a newly-invented stateful logic unit (e.g., implemented as an arithmetic logic unit ("ALU")), as later described. In any event, a preferred embodiment, therefore, allocates from the common memory unit pool to include some or all of them in the flexible allocation capability of memories for two or more of these tables/functions. Action memory word width is extended to the same 112b of match memory, yielding 96b of data plus 8 field-valid bits per unit memory (104 bits total), in addition to the 8 ECC bits.

Another aspect of OpenFlow is the ability to collect and provide packet statistics, thereby requiring of the OpenFlow memory a statistics memory/table. OpenFlow describes 64 bit byte and packet counters for each flow entry in each table. Full resolution counters are kept off-chip in DRAM, while limited resolution counters are held on-chip. S. Ramabhadran and G. Varghese authored, "*Efficient implementation of a statistics counter architecture.*" In Proc. of 2003 ACM SIGMETRICS, pp 261-271, 2003, hereby incorporated herein by reference, describing the LR(T) algorithm. Using this algorithm, optimal tradeoffs can be made between on-chip resolution and DRAM update rate. In a preferred embodiment, the on-chip counters are implemented using unit memories from the preferred embodiment pool of such memories (e.g., 1 K word unit memory), with counters for two flow entry locations in each memory word. Each counter increment requires a read and write memory operation, but in the 1 GHz pipeline only one operation is available per packet, so a second memory port is synthesized by adding one memory bank. Other techniques synthesize a write port by adding two memory banks, where the two memory banks synthesize a single bank of a two-port memory, but have less overhead from other logic. While either method may be used, for the sake of simplicity and clarity of text, the extra memory required for synthesizing a second memory port will be described as a single extra memory bank, with the understanding that either method may be used. As a result, for a match table with a total of N×1 k flow entries, N/2+1 memory banks are required for statistics. The worst case aggregate DRAM update rate from all tables is below 1 MHz. Statistics counter memories also may be configured for three flow entries rather than two per word for some or all tables, economizing on statistics counter utilization at the expense of higher DRAM update rates. If statistics are required for only the byte count, more entries, such as four, could be contained per word. If statistics are required for only the packet count, more entries, such as four to six, could be contained per word.

As noted above, in a preferred embodiment switch 14, the inventive memory pool includes unit memories, from which a unit memory or plural unit memories may be selected so as to serve during that selection period as a match memory or action memory, and having introduced above statistics memory, note that a preferred embodiment further operates to allow unit memories from the pool also to be apportioned to serve as statistics memory. In one preferred embodiment, therefore, the number of unit memories included in the entire pool of unit memories is increased to accommodate various considerations with respect to the attributes of statistics. Preferably, therefore, another array of eight wide by three deep unit memories is added to the pool to account for average statistics counter utilization, given the following considerations. With wide match fields, fewer entries are available, so fewer unit memories are consumed by statistics. Likewise, if a user does not desire statistics to be kept for a particular table, these unit memories are available for other uses, such as match and action memory. With statistics for two flow entries kept in a single word of statistics memory, a two by eight array of unit memories is required for statistics for an eight by four array of memories used for match, assuming that the array is used to create a single table of 32 K 64 bit entries. Likewise, a one by eight array of unit memories is required for statistics for the TCAM, if it is configured as 2 K×8 entries of 80 bits. Two additional unit memories are added for the synthesized write ports for the exact and ternary match tables. These are also a part of the general pool of unit memories, which in the example described herein now totals 4×8 for matching, 6×8 for actions, and 3×8+2 for statistics. Note, however, that this assignment of unit memories to specific functions (e.g., match, action, statistics) is meant to represent a typical operating profile and does not indicate a fixed assignment of memory units to functions, or even a fixed number of memory units in the match-action stage.

It was stated earlier that a match stage may contain up to 16 individual match tables. If statistics are kept for all of these tables, each table requires a minimum of one memory bank for statistics (or more banks, depending on the number of flow entries in the table), and an additional bank to synthesize a second memory port for write. In some cases it is known that the execution of two or more tables in a match stage is mutually exclusive. Accordingly, predication logic may be included so that multiple tables may be included in a same match stage, even when the execution of one is predicated on the successor indication of a prior table in the same stage. For example, a graph of table execution may show that after table A executes, its output goes to either table B or C. Each of table B and C go to a table D. In that case, B and C can never execute for the same packet. This arrangement of tables can be thought of as a graph, where a first node A has multiple possible successors, where only one successor is executed. In these arrangements, statistics counter memory can be combined. For example, in the case above where B and C never execute for the same packet, both B and C could share the same spare bank, and may share their banks of statistics memory. For example, B and C separately may each require 1½ banks of memory to hold statistics, plus an extra bank to synthesize the write port. Since it takes two banks to hold the 1½ banks of data, a total of six banks are required for tables B and C. But if they never executed for the same packet, their capacity together requires three banks, plus one spare bank, saving two banks.

In the above case where pairs of tables are executed in a mutually exclusive manner, it also may be possible to merge action and meter memories from those tables into common memories. This may improve efficiencies if each only partially uses unit memory resources, and for meters allows a single extra memory bank for synthesizing the write port instead of one for each memory. But the ability to do this optimization depends on pipelining. The predication outputs, which represent whether each table is actually executed or not, must be available early enough to control address multiplexers for action or meter memory. If these memories are accessed before that predication information is available, then this optimization cannot be used, unless the pipeline is altered to delay the memories' accesses, which increases latency. Statistics memories on the other hand, may have their access delayed without any pipeline latency impact, because results from statistics do not feed back into the pipeline output of the modified packet header vector. In fact, while it is often preferable to process a packet through the match pipeline as soon as the packet header is fully available, so-called cut-through mode, without waiting for the full packet body to physically arrive, packet length information is not known at this time and so generally statistics processing is postponed until the full packet has arrived.

OpenFlow meters are a type of action used to measure and classify data flow rates versus prescribed limits. Meters differ from some action memory in the sense that general action memory is read-only, but when a meter is accessed, data held in the meter is updated (i.e., there is a read, modify, write operation). Meters contain some read-only data in the form of the allowed rates and burst sizes. For a three-color meter, allowed rate and burst size is stored for the first two colors. Other information, which is updated, represents the current bucket status of the first two bands. This information can be represented, with ECC, in a 112 bit unit memory word. Because the memory is both read and written every clock cycle, the second memory port is synthesized by adding another memory bank, an additional unit memory, in the same way done for statistics memory.

Recall from above it is stated that additionally a preferred embodiment switch 14 may include what are herein referred to as stateful memories so as to accommodate a newly-invented stateful logic unit. Stateful memories, as discussed above with respect to meters, may be considered an action memory that may be updated, via a stateful logic unit, by the action and involving a read, modify, write operation. In addition and as further detailed below, the particular operation of the stateful logic unit is in response to an instruction that is selected from a plurality of instructions. Thus, in contrast to other OpenFlow logic units that perform an identical function (based on the corresponding memory/table) each time, the preferred embodiment stateful logic unit is programmable, receiving an instruction and performing a corresponding read, modify, write operation, representing a change in state. In any event, therefore, in consideration of the preferred embodiment memory pool, stateful memories, as also discussed above for meters, require an extra memory bank to synthesize a second memory port. Meters and stateful memories from a single flow table can be allocated into the same memory unit. Note also that stateful memories, via the corresponding programmable stateful logic unit, allow more flexible generic computation, both to update their state and to provide an output for use by the match stage action engine. For example, a stateful memory word may be accessed with an instruction, selected from a plurality of possible stateful instructions, which increment the field, or zero it out. A separate instruction, also selectable from a plurality of possible stateful instructions, provides an output value, which might be the stateful memory word value itself, or an arithmetic comparison of that word with a supplied constant, or some other function. Other stateful instructions may be further ascertained by one skilled in the art with an additional example provided below.

As an example of an operation beneficially using stateful memories, consider Generic Routing Encapsulation (GRE). A number of packet headers together are matched against entries in a match table to identify each specific flow. The packet is encapsulated with a GRE header by the match's action. One of the fields inside the GRE header is a GRE key, which is meant to identify the flow. Another description commonly used in the industry is that GRE encapsulation creates a tunnel, through which all packets in the specific flow go. Each individual tunnel is identified by its GRE key. The GRE key value is put into the GRE header simply as an action which occurs as a result of matching the particular flow. Another optional field in the GRE header is a sequence number. This number is meant to increment each time a packet for that flow and GRE key is encapsulated (and goes through the GRE tunnel). A particular stateful memory entry (word) is pointed to by the action resulting from the match of a particular GRE flow. Thus, an instruction to the stateful logic unit, selected from a plurality of stateful instructions, directs the outputting of the current value held in the stateful memory as the GRE sequence number, and also specifies incrementing the sequence number value and storing it back into the stateful memory word. The outputting and auto-incrementing can be thought of as a single instruction or two separate instructions, to the stateful logic unit. As two separate instructions, in one instruction the stateful memory value is presented to the stateful logic unit where it may be modified, then output to the action processor, which can put it into a field in the packet header vector. The stateful logic unit logic unit may perform some function on that memory value or a function may be performed on the memory value before it is output from the stateful memory processor to the action processor. As a second instruction to the stateful logic unit, an operation is specified on the memory value which directs how it is to be modified before being stored back into the stateful memory location.

A second example using stateful memories and the corresponding stateful logic unit involves OAM processing. OAM is both a general term for Operations and Maintenance and the name of a specific system that helps to quickly identify failures in networks. OAM capable switches on the edge of a network send out specific types of packets to all switches on the edge of the network, and expect packets in response. If no return packets are received after a certain number of the transmit ping packets, an alarm is raised. OAM is meant to check not only the physical hardware and connections between switches, but all the software and configuration; a problem in any of these areas could cause loss of the ping packet or its response. In a preferred embodiment, a stateful memory table maintains an entry for each OAM flow, that is, each destination to which it sends packets. When the switch sends a packet, a first instruction to the stateful functional unit increments the stateful table entry; when it receives a response packet a second instruction to the stateful functional unit zeroes out the state of the table entry. Also on transmit, the stateful functional unit checks the stateful table value, and if it exceeds a prescribed value, controller 12 is notified that there is a problem with the path. Here, the stateful functional unit instruction to produce an output value is a compare with constant; presumably the action is to set a flag bit in the packet header vector which indicates to send the packet to the controller as the alarm. The instruction to modify memory state is either increment or clear.

In one implementation, a set of plural instructions is written to a small instruction memory from which an instruction may be selected for a stateful functional unit, and the action provides the index of the instruction to be selected from the set. The instruction computes a function on the stateful memory contents for output to the packet header vector (via the action engine) and computes another function to update the state of the stateful memory. Alternatively, those two functions could be in separate memories, with separate indices provided for each of them.

Having earlier discussed meters, note that a meter also can perform a read, modify, write function. Each meter memory location contains several data items, some of which get updated and others of which do not. The algorithm for updating meter state is hardwired. The function for providing an output first reduces the data to a single color result (one of the three for a three color meter for example), and then uses that result to affect the packet header vector state. Typical actions are changing the value of the DSCP field inside the IP header (which specifies priority; lowering priority of this packet) or setting a bit in the packet header vector which will cause the packet to be dropped.

Having described both stateful and meter memories and functionality, note further that in the same way the preferred embodiment pool of memories may serve as match and action memories, both the stateful memories and meter memories are also preferably allocated out of the pool of unit memories.

Figure 3:
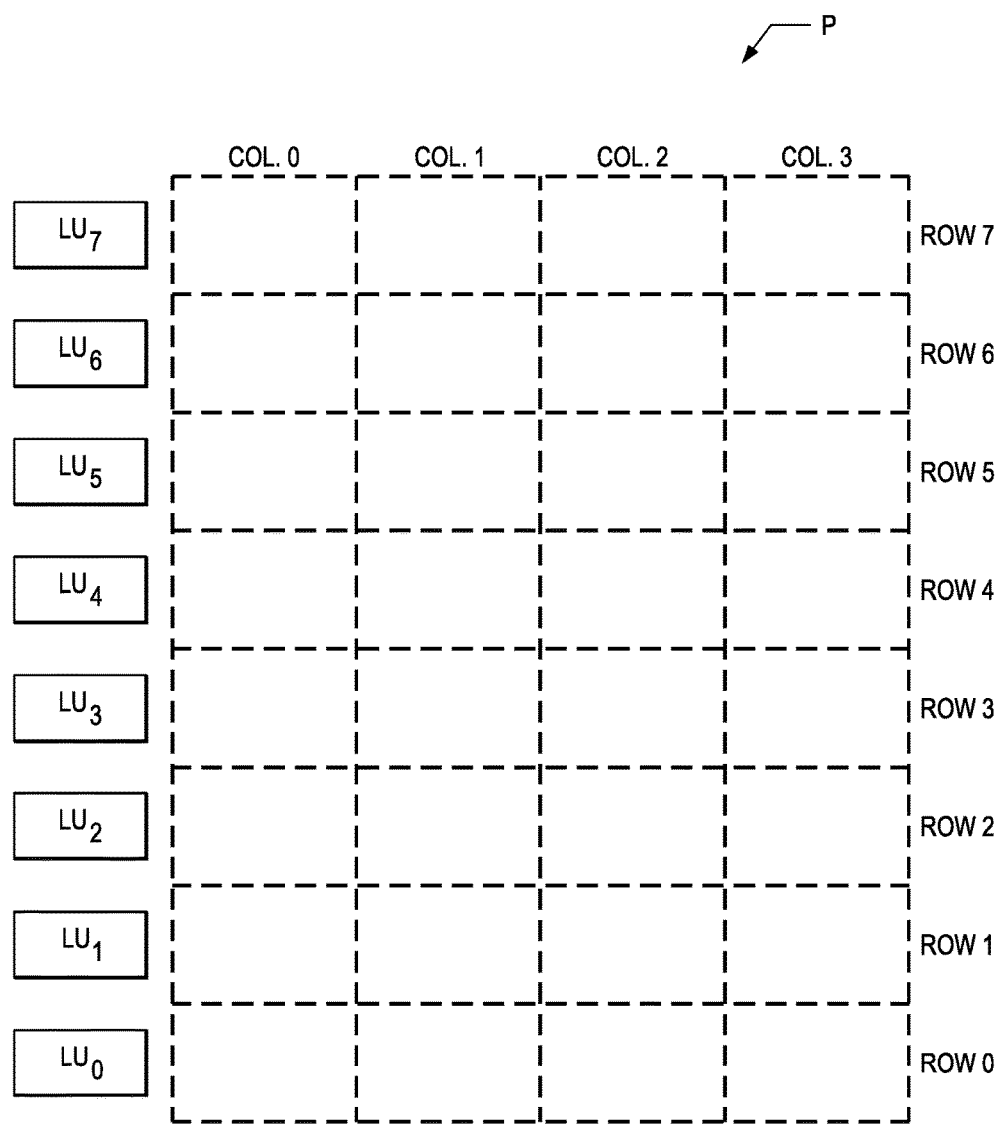
FIG. 3 illustrates, by way of introduction, a common pool P of unit memories, each shown by dashed lines.

Given the preceding, FIG. 3 illustrates, by way of introduction, a common pool P of unit memories, each shown by dashed lines. Preferably, pool P is formed as an array of unit memories, with desirably reduced wiring and packing distances between each unit memory, and as introduced earlier, with each unit memory formed as an SRAM. Further per the above example discussion, each SRAM unit memory may be 112b wide by 1 K words deep. In the example of FIG. 3, a total of eight rows and four columns of unit memories are provided, for a total of 32 unit memories. For sake of illustration, associated with pool P are also either logic units $LU_0$ through $LU_7$, where it should be understood from earlier that each logic unit $LU_x$ may be selected so that the unit memories that are accessible to the logic unit can serve an OpenFlow function based on the logic unit; for example, a logic unit could be any of a match, action, statistics, meter, and stateful logic unit, so that respectively, a unit memory accessible to the logic unit may serve as a match, action, statistics, meter, and stateful memory. Given this general layout, some implementation details are now presented for an architecture and allocation methodology in the inventive preferred embodiment sharing of unit memories from the pool P, so as to serve as a different one of any of match, action, statistics, meter, and stateful memories.

Match memory and action memory have in common the property that during normal operation, they are read-only. Their contents are set up under program control of the CPU of the supervising controller 12. They may be loaded with initial contents, and then incrementally altered or updated by the CPU during processing. Generally this happens so as not to interfere with the packet processing pipeline. For example, it was stated above that the maximum packet rate for a 64 port×10 Gb/port switch is 960M packets/sec. With a 1 GHz pipeline, that leaves a minimum of 40 MHz of unused bandwidth in which other operations may be performed, including updating contents of these memories. From the perspective of writing these memories, the on-chip mechanism for match and action memories is identical. A data bus must broadcast a value to the write data ports of all unit memories. It may broadcast a 112 bit value to all memories in the entire pool, or provide data in some other format, such as 8×112b bit data which allows writing an entire column of 8 unit memories at once, or it may broadcast some other multiple of 112 bits to write a number of memories in parallel. Whatever the configuration, this programmed write data is the only write data source required for these memories for match and action functionality (more sources will be required for statistics and stateful memory functionality). The programmed write must provide a write address to be multiplexed into the address ports of all the memory units.

The read operation of an exact match memory has several components. An address is generated by computing a hash value on a selected set of packet header vector input bits. Generally, several fields of the packet header vector are routed to the match memory through a crossbar. Then a mask register enables or disables each bit individually, since the user may want some bits not to participate in the match. Then the hash value is computed from the masked value and sent to the memory address port. The crossbar output is also routed to the memory output, where it is compared to the memory read data, again with the comparison of each bit enabled by a mask, generating a data equal output signal. The mask is the same mask used in the hash generation logic. The field valid bits from the memory output and the equivalent bits from the crossbar output are also compared and required to be equal. Generally, if a field valid bit is zero, the data in the memory is required to be zero, and if a field valid bit in the input match data is zero, its associated data is required to be (or masked to be) zero. This prevents unused bits from affecting hash generation and the affecting the memory address. The valid bit held in the match memory output word must be true. There are also several version valid bits, and the function of these together with version data associated with the packet and applied to the match must be true. For a match to be signaled, the data equal output signal must be true, the valid bit must be true, and the version test must return true.

Error checking/code correction (ECC) is also checked. If an ECC error is found, implementations may choose to correct the error, or just to signal a fault to the supervisor CPU and have it rewrite the correct value. Generally, ECC errors when reading memories should be rare occurrences, so when such errors occur, little performance is lost by sending the packet to the controller or using some other mechanism to resubmit the packet to the pipeline once the ECC error has been fixed by the CPU rewriting the memory word.

While not shown in FIG. 3, note that certain unit memories (e.g., by column) will have associated structure (e.g., multiplexing) for coupling logic units to the unit memories. Recall that a preferred embodiment unit memory is 112b wide, with 64b of match data when the full overhead width of 48b is included. However, when matches are made wider by logically concatenating more unit memories, there is no additional overhead, other than possibly ECC, so in general, matching of data is not simply restricted to comparing the 64 data bits plus 4 field-valid bits in each memory unit. All bytes have comparisons, with the comparison of each bit individually masked. The byte-equal comparison outputs are AND'ed together under control of configuration bits to create a number of match-entry-data-equal signals. It was stated before that the total 640b width could be split up to create 8 separate word entries. The actual case is more complex; rather than each unit corresponding to a single output, with the potential to merge them in groups of unit memories, this is done at a finer level, where each byte can be assigned to a particular match entry. For example, two unit memories may be merged together and three match entries held in the total 224 bit width. Or three match fields from four units of width, or five from four, or eight from four, or in general, any number of match fields up to the maximum number supported by the hardware, for example, 16. In this way, more than eight entries can be put in to an eight unit wide word.

All of this match comparison logic is a structure that resides next to each column of eight unit memories. In a scenario with no configurable sharing of memories between match, action, and statistics, only four columns of memories would have this logic associated with them. With the preferred embodiment inventive configurable memory allocation, all columns may incorporate this logic, or alternatively, if it is decided there is some minimum number of unit memories that will never be allocated to match (due to minimum requirements for action memories for example), then those unit memories that will never be allocated to match will not need this associated match output logic. For example, one column might omit match comparison logic. But it is anticipated that at a minimum, a substantial fraction of the unit memories would have this logic so they could be configured as match memories.

Action memories also have associated output logic. In general, it is possible to output up to eight unit memory widths of data (8×104b=8×96b+8×8b field valid) from exact matches and the same quantity from ternary matches. If the exact match logic is configured as a single table, it may output eight units width of data. If it is configured as two tables, each may get some of the memory units of output width, for example each may get four memory units or one may get five and the other three. These different groups will be in non-overlapping rows, with the result that each match table is allocated some of the rows of action unit memories. Then the action unit memory output data configuration is that along a row, all unit memory outputs are multiplexed together to provide a single action data output. Each unit memory row has a similar output multiplexer arrangement. When different rows correspond to different tables the multiplexer control of each row is individualized.

Ternary matches have a similar action memory configuration, being able to output a full column of 8 memory unit memories' width of data. This logic amounts to a separate multiplexer structure on the outputs of the action unit memories. As a result, a total of 2×8 RAMs×104b data can be output. If more match output data is required, or a more flexible arrangement than the separation of action data RAMs into rows according to which table each belongs to, then a larger number of output multiplexers can be used, potentially with further data reduction after the multiplexers.

If ternary match TCAMs are divided into a larger number of narrower units, for example 16 units of 40 bits each, they still may be combined into deeper tables (with more entries) or may remain in groups as separate tables, but for the simplest implementation each separate ternary table controls specific rows of action memory, separate from the action memory rows of other ternary tables. Or, in the more complex implementation, a row of action memories may provide output for multiple ternary tables and require a separate output multiplexer for each possible table, with the results of all rows eventually combined into a single 8×104b action output.

This is but one example of how multiplexing logic could be arranged from action memory outputs to give flexible capability to output actions. Other configurations are possible. But the summary of action memory output logic is that there is logic associated with each memory word output in each column, and further logic interspersed between columns to form downstream multiplexer logic. In the non-configurable arrangement, a total of 6 columns (for example) of memory units would have this associated output multiplexing logic. The number of columns may vary by design, but generally, these columns would not overlap with the columns of memories used for match. In contrast, in the configurable arrangement, the columns of memories with match output logic may expand, the number of columns with action output logic may expand, but the expansion would result in an overlap between the two so that some columns had both match output logic and action output logic. Any unit memories with attached logic blocks for both match output comparison and action output multiplexing could be configurable as either match or action memories. It is anticipated that the number of these configurable memories is desired to be as large a fraction of the total as is reasonable, limited only by system constraints that make it unlikely that more than that number of memories could be required to be configurable as either match or action. Note that it is likely that most, if not all memories would be configurable for match, since there are scenarios that require no statistics and little or no action memories, but the number of memory banks or columns never usable for action may be larger; the goal of configurability is to provide as many match locations as possible, and it is likely that the minimum number of columns usable for match would be 4, since 4 way hashtables are used.

The propagation of addresses to match and action memories has a feature in common with the output data configuration above. Address propagation to match memories has one architecture resulting in an address input to any memory potentially used for match. Address propagation for action is more complex in that it involves configurable routing from the addresses of any of the match outputs to any of the action memory inputs, but it is similar in that it presents an address (possibly at the output of logic which multiplexes several addresses together) to a memory used for action. In the configurable arrangement, there exists at least a subset of memories configurably usable for either match or action, so these would need both address sources at their inputs, selected by a multiplexer according to configuration for match or action.

Statistics memories may be built out of the same unit memory used for match and actions, the 1 K word by 112 bit memory in this example. As described above, using the LR(T) algorithm, the byte and packet statistics counters for two match locations may be held in a single data word, or alternatively, the byte and packet statistics counters for three match locations may be held in a single data word, reducing the memory requirements for statistics at the expense of a higher update rate to DRAM. As an example, if it is not possible to configure all tables with three entries per statistics memory word because of the excessive DRAM update rate, small tables could use two entries per word and the largest tables could use three entries per word. This saves the largest number of statistics memories while costing the least increase in DRAM update rate.

In general, if there are a maximum of 16 match tables in a match stage, there may be 16 separate statistics memory assemblies. Each unit memory that may be configured as a statistics memory requires multiplexing connections on its address input so that its address input may come from the correct match table. Incrementing a statistics counter involves doing a memory read, adding the increment value (one packet for the packet counter and the appropriate number of bytes to the byte counter), then writing the value back into the memory. A simple embodiment of the output logic is that all memories that may be used as statistics memories have their read data outputs sent to a crossbar that creates the 16 outputs, one for each possible match table. Each of these 16 values gets appropriately incremented, then the 16 values are broadcast back where the memory bank which is written can select the correct write data value from all the 16 values, equivalent to another crossbar for the write data. In practice, full read data and write data crossbars are unnecessarily costly in terms of the number of the number of wires they require, so the preferred embodiment provide other arrangements that can reduce wiring cost while still maintaining sufficient flexibility so memories can be assigned to statistics counters as desired, as further described below.

In order to show the difference in wiring cost between the above-introduced crossbar approach and an improved preferred embodiment approach, a block diagram of a simplified wiring diagram of a crossbar approach is shown in FIG. 4, along with pool P of unit memories. Here, the configuration provides for 16 separate statistics counters (shown as logic units $LU_0$ though $LU_{15}$), where each counter may be assigned any of the represented unit memories. For this example, such unit memories are shown arranged into 8 rows, numbered from 0 to 7, with W memories in each row (e.g., W=13). In the general and most wiring intensive example of FIG. 4, the intent is to illustrate an embodiment scenario wherein any logic unit $LU_x$ can, at a time, access any respective unit memory.

Continuing with FIG. 4, there are 16 copies of write data, one for each statistics counter $LU_0$ though $LU_{15}$. These are broadcast to each memory. If the write data is the 112b width of the memory, then 16×112 bits must be wired, hereafter referred to as 16 write data words. There is a copy of these 16 write data words wired horizontally to each of the eight memory rows. For reading, there are 16 read data words. The output from each unit memory SRAM may drive any of these 16 read data words. While multiplexers may result in a tree of logic and wiring, in FIG. 4 each read data is considered as a single wire, such as would be the case if the outputs were wired in a daisy-chain fashion to minimize wiring. So in each row there are also 16 read data words of wiring. This discussion presumes memory signal ports are located along the left or right sides of the memory blocks for ease of access by the horizontal wires. If memory ports are on the top or bottom edges, the horizontal/vertical orientations of this discussion are simply reversed.

In the match-action stage that has been described, with a total of 13 columns×8 rows of memories, plus two, it might be reasonable to reserve, from pool P, four columns only of unit memories to serve as match memories, leaving nine columns of unit memories in pool P that may be configured as statistics memories. If each row had additional crossbars for read and write data, as shown for Row 7 in FIG. 4, the number of copies of read and write data running horizontally could be reduced to 9, an improvement, but still a substantial amount of wiring. Vertically, there are 16 copies each of read data and write data.

Figure 6:
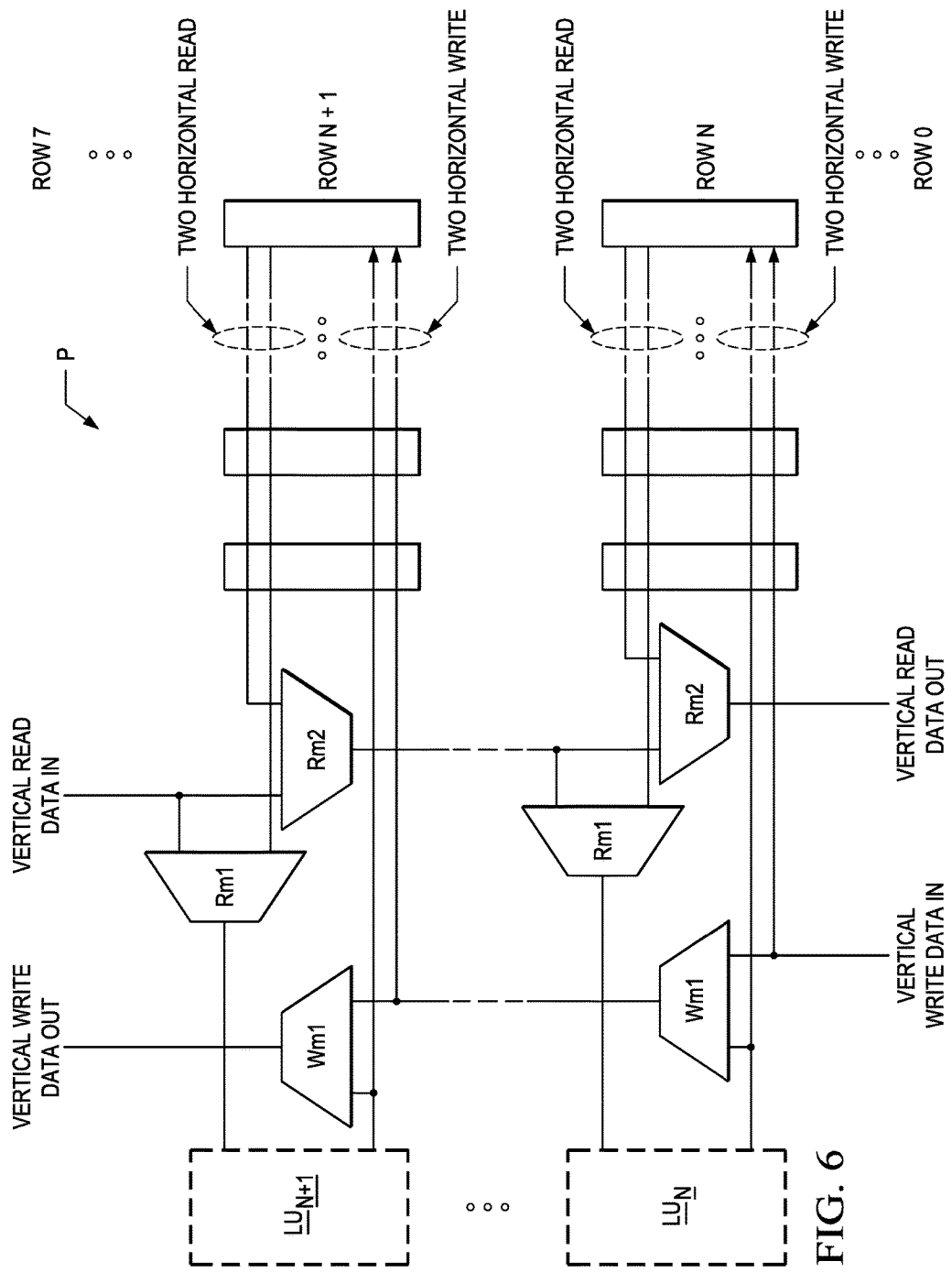
FIG. 6 shows an arrangement, with unit memory pool P and supporting logic and structure, that provides vertical data flexibility as compared to FIG. 5.

In a preferred embodiment as shown in FIGS. 5 and 6, additional flexibility is provided and the cost of full crossbars is not necessary. The system will be explained first with a unit memory array with 8 rows as in FIG. 4, but for simplicity will have a total of 8 rather than 16 individual statistics counters (shown in FIG. 5 as $LU_0$ through $LU_7$). It will later be extended to 16 statistics counters. In addition to the unit memories and read/write wiring, a respective logic block $LB_x$ is required for each statistics counter. This performs ECC (error checking/correction) on incoming read data, does the proper increments to the byte and packet fields, and generates ECC code bits for the result, which is then broadcasted back to the UNIT memories. FIG. 5 shows an arrangement of a pool P array of unit memories used for statistics, where a logic block $LB_x$ is placed in each row. This shows the fortuitous but typically unlikely arrangement where each statistics counter uses only memories from one row, eliminating the need for vertical broadcasting. A realistic implementation must allow for more flexible assignment of unit memories to the varying size statistics counters.

FIG. 6 shows an arrangement, with unit memory pool P and supporting logic and structure, that provides full flexibility as compared to FIG. 5, with a total of 8 rows by example, where only two rows, shown as Row N and Row N+1, and their respective logic units, are shown, with it understood that such rows are between the uppermost and comparable Row 7 and the lowermost Row 0. Each Row in the FIG. 6 embodiment has only a total of two horizontal copies of read data wiring and two horizontal copies of write data wiring per row (versus the 16 or 9 above), and a total of one vertical copy of read data wiring and one vertical copy of write data wiring (versus the 16 above). Thus, the FIG. 6 arrangement is far improved over either the FIG. 4 or FIG. 5 approach for providing selectable couplings between unit memories and the logic blocks (e.g., statistics counters) to which the unit memories require access.

Further in the preferred embodiment, a methodology is provided to allocate unit memories according to the FIG. 6 arrangement, so as to allow each group of unit memories, acting as a table, to have connectivity to the corresponding necessary number of logic unit blocks. More specifically, unit memories are allocated to logic units (e.g., statistics counters) using the following rules (assuming eight statistics counter and eight rows, an equal number of counters and rows): no more than two statistics counters can be assigned to the memories on a same individual row, and every row must form the bottom row of the group of unit memories used for one statistics counter (or other logic unit). These rules will be explained below, but by way of introduction and with the example of FIG. 6 each of the Read and Write is discussed below.

Examining FIG. 6 with respect to read, the Vertical Read data in (from higher rows) can source the read data for any given lower row by a multiplexer Rm1 on that given lower row, or it can be passed to any row even lower than the given row through a multiplexer Rm2 for that given row. For example, as illustrated with respect to Row N+1, read data may be provided to that row from any higher row of Row N+2 up to Row 7, by way of multiplexer Rm1 in Row N+1. Further with respect to Row N+1, the read data from any unit memory on that row can be passed to any lower row of For N down to Row 0, by way of multiplexer Rm2 (and any other multiplexer Rm2 on a lower row(s)). Alternatively, note also that for each row, the read data for that row can be passed by multiplexer Rm1 to the logic unit $LU_x$ of that same row. Thus, for Row N+1, read data for that row can be passed by multiplexer Rm1 to the logic unit $LU_{N+1}$ of that same Row N+1. In summary, therefore, the read output data of any unit memory on a row can be passed to that Row's respective logic unit $LU_x$ through multiplexer Rm1 of that row, and it can be passed to any lower row through multiplexer Rm2 of that row. So, for a given row, the logic unit $LU_x$ can independently select and read data from either unit memories on that same given row, or from any row above the given row.

Examining FIG. 6 with respect to write, the Vertical Write data in is broadcast to all W unit memories along a row. For example with respect to Row N, the Vertical Write data in is shown by horizontal connection to all W unit memories in that row, and similarly with respect to Row N+1, the Vertical Write data in is shown by horizontal connection to all W unit memories in that row. In addition, the Vertical Write data in for a given row may be passed to a higher row by way of the given row's multiplexer Wm1, and any higher row (except the top row, [e.g., Row 7]) likewise may pass the Vertical Write data in to a higher row by its respective multiplexer Wm1. For example, the Vertical Write data in for a Row N may be passed to the higher row N+1 by way of multiplexer Wm1 in Row N, and the higher Row N+1 may likewise pass the Vertical Write data in to any higher row (Row N+2 up to Row 7) by the multiplexer Wm1 in Row N+1, and any respective multiplexer Wm1 in a higher row. In addition on each row, the output of the logic unit $LU_x$ for that row is broadcast to all W of its unit memories. For example, logic unit $LU_N$ broadcasts its output to all W unit memories in Row N, logic unit $LU_{N+1}$ broadcasts its output to all W unit memories in Row N+1, and so forth for other rows (not shown). In summary, therefore, the unit memories in each row can each select write data from the logic unit $LU_x$ in the respective row (the logic block output) or from the from the logic unit $LU_x$ of a lower row.

Given the preceding and summarizing, in a preferred embodiment, the unit memories of a row can always get write data from, and source read data to, the logic unit for the respective row. The unit memories also may get one write data source from a logic unit of a lower row and a row unit memory can output one write data source to a logic unit on a higher row. The logic unit of a row can source its data from one read source from a higher row, and the unit memories of a row can output one read source to a lower row.

Further given the preceding FIG. 6 layout, the preferred embodiment further provides an allocation methodology for allocating unit memories and logic units among the layout, wherein a group of unit memories is allocated to a respective logic unit as follows, and as shown in a flowchart methodology 700 of FIG. 7. Note that the allocation methodology may be implemented both in circuit construction for logic unit layout and by programming controller 12, such with a compiler or like that comprehends the methodology, so as to assign unit memories to one of the different types of logic units. Moreover, of course, the resulting assigned memories, and supporting logic unit layout and connectivity, thereby form an inventive structure as implemented in switch 14.

As an example, assume the number of logic units $LU_x$, for example operating as statistics counters, is equal to the number of rows. That restriction will be relaxed later. If the number of unit memories a statistics counter requires is less than or equal to the number (i.e., W) of available unit memories in a row (step 710, YES), then (step 720) all unit memories are allocated from a same row, and the logic unit (e.g., serving as the statistics counter) associated with those unit memories is located on the same row. If a statistics counter requires more unit memories than are on the given row corresponding to the counter (step 710, NO), then (STEP 730) in addition to unit memories on that given row, one or more additional unit memories are allocated from higher contiguous rows, while the logic block is on the lowest row allocated. For purposes of reference, unit memories on the same row as their logic block are called "fixed" units, while unit memories on different (higher) rows than their logic block are called "floating" units. A row can contain floating units from at most one statistics counter.

Figure 8:
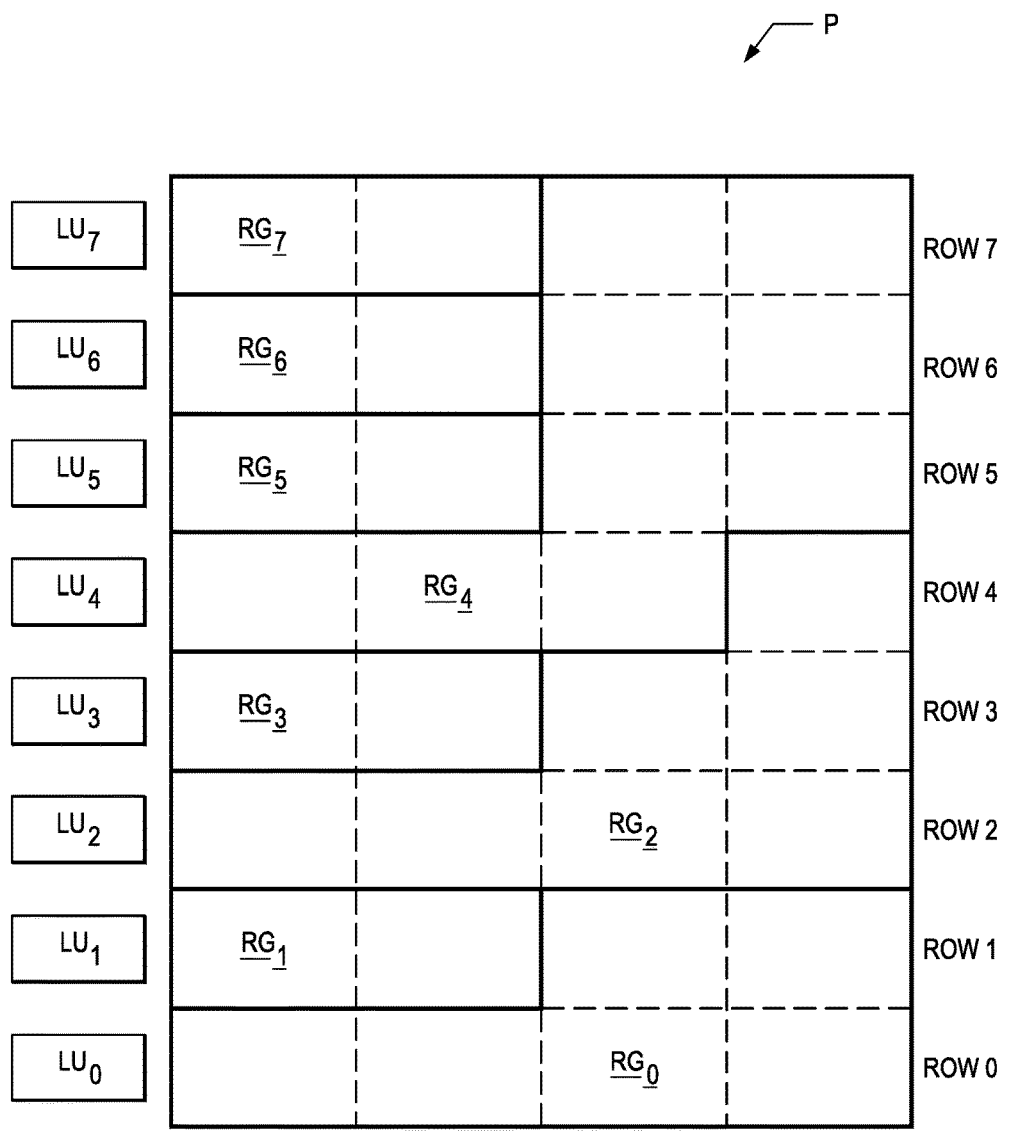
FIG. 8 illustrates a diagrammatic representation of an example of the preferred allocation methodology of FIG. 7.

FIG. 8 illustrates a diagrammatic representation of an example of the preferred allocation methodology introduced above. The example of FIG. 8 represents a pool P providing a plurality of unit memories and arranged in a configurable layout in the nature of FIG. 3, and as shown by dashed lines includes a total of 8 rows, where each row includes W=4 unit memories, and where each row has a respective logic unit $LU_x$ that provides functionality based on the type of table (e.g., memory, action, statistics, and so forth) being served by memory pool P. The example of FIG. 8 further includes darkened solid lines to enclose each of eight regions $RG_0$ through $RG_7$, where each region $RG_x$ represents a number of unit memories allocated to an individual respective logic unit $LU_x$ (e.g., statistics counter). No row contains more than two regions $RG_x$. Each region $RG_x$ includes one unit memory at the extreme left of its area; that represents a fixed unit memory on what will be referred to as the region's "home row," meaning that row which corresponds to the same logic unit $LU_x$ that processes data for that row. The home row is always the lowest row of a region $RG_x$.

Figure 7:
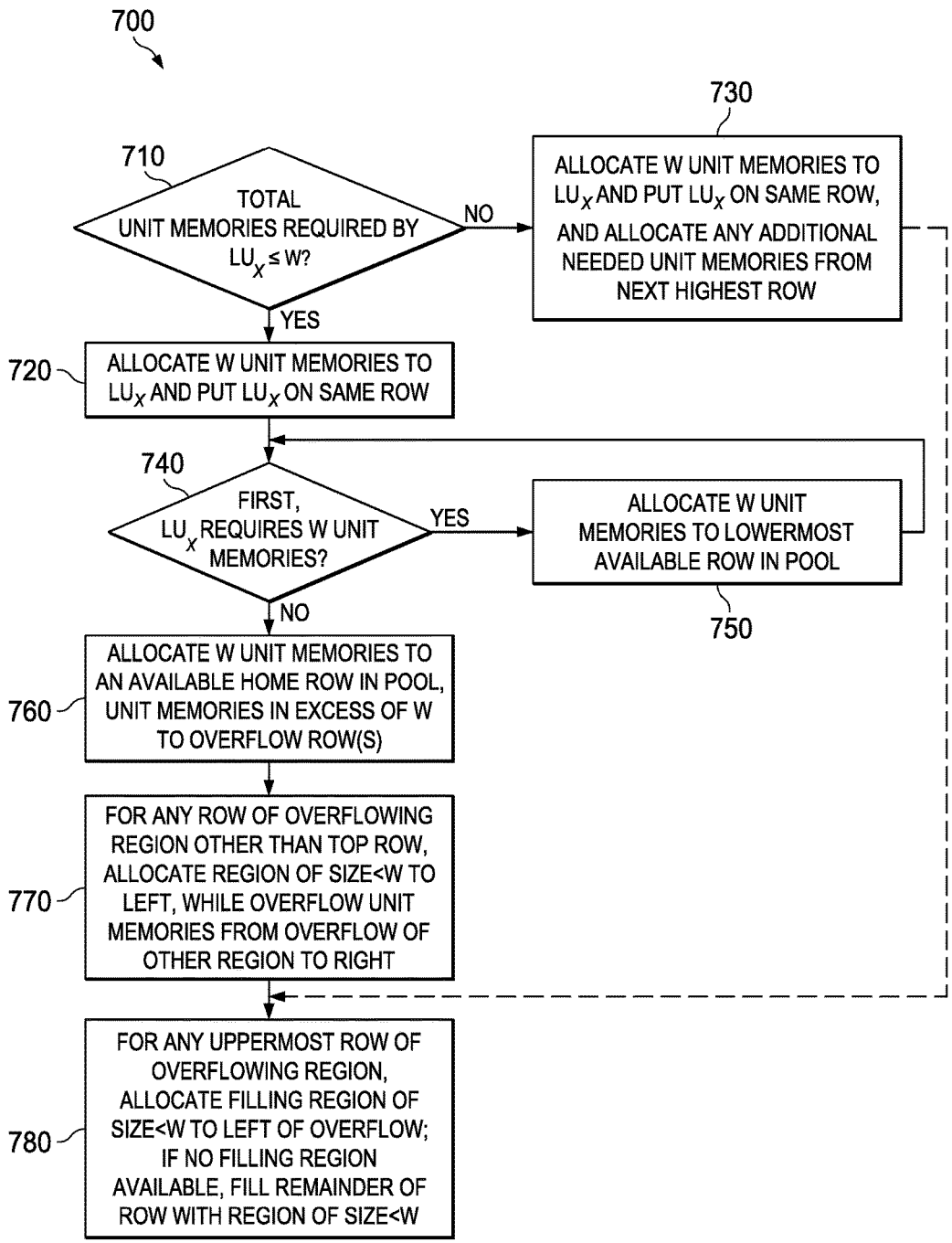
FIG. 7 illustrates an allocation methodology for allocating unit memories from the pool P, logic units among the layout, and assignment of regions, where each region includes a number of unit memories assigned to a respective logic unit.

Given the illustration of FIG. 8, the preferred embodiment allocation methodology 700 of FIG. 7 is now further explained for selecting allocated memories to form a region of memories corresponding to the respective logic unit $LU_x$. Thus, the following uses FIG. 8 as an example, which involves a sequence of additional allocation steps. Further refining step 720 is a conditional step 740 that, first, identifies any row that has W unit memories per row, and for that row step 750 starts by allocating that row to the bottom row of the available unit memories in the pool P. First, allocate all regions of exactly size W, one per row, starting from the bottom of the unit memory pool P and moving upward. In the example of FIG. 8, where W=4, it is assumed there is no logic unit $LU_x$ requiring 4 unit memories and, hence, there is no region $RG_x$ of size W and no such region is shown; however, if a region existed in the example of FIG. 8 that required 4 unit memories, then since that requirement equals the illustrated size of W, such a region would be placed along Row 0 (and likewise, if another such region existed, it would be placed along Row 1, and so forth). Continuing with the methodology, second in step 760, allocate a region $RG_x$ with size >W, which will necessarily fill the row and have more "overflow" units for one more of the next higher row(s). In FIG. 8, therefore, region $RG_0$ has unit memory size=6, so four of its unit memories are allocated as fixed units first to row Row 0 as its home row, and it therefore has its remaining need unit memories (i.e., (6 needed)–(4 already assigned)=2 remaining) assigned as overflow unit memories allocated as floating units to the next higher row, Row 1, where the location of the floating unit memories is next explained. After having located a given region having overflow unit memories that will extend upward beyond its home row, because its size >W (e.g., such as region $RG_2$), in the next upper row, up to all rows except the top row occupied by the given region, at the left, step 770 allocates a region of size <W, and toward the right fill the rest of the row with overflow floating unit memories from the region below of size >W. For example, for region $RG_2$, its home row is Row 2, and in the next upper row, Row 3, a region $RG_3$ of size=2<W=4 is allocated and left justified, and toward the right of region $RG_3$ are located two floating unit memories from the region $RG_2$, which recall has its home row below region $RG_3$. Third in step 780, in the uppermost row a region $RG_x$ of size >W occupies, if the row can be exactly filled by the floating units and a region <W, add the region $RG_x$ of size <W to the left of the overflow. Returning to region $RG_0$ by example, the uppermost row it occupies is Row 1 with 2 floating unit memories therein, leaving W−2=4−2=2 unit memories remaining to the left on Row 1, and therefore the remainder of Row 1, to the left of $RG_0$, is preferably filled with a region also having 2 unit memories, as is achieved by allocating region $RG_1$ as shown. If no such row completing region is available for this third criterion, then the preferred embodiment fills the rest of the row with another region >2 (not >W, just large enough to overflow; fill can occur with exactly 2, to exactly fill the row, or with >2 so it overflows, but not <2), which therefore is a further elaboration on step 730, described above, as indicated by a dashed arrow in FIG. 7. For example, looking at region $RG_2$, the uppermost row it occupies is Row 4 with 1 unit memory therein, leaving W−1=4−1=3 unit memories remaining on Row 1; however, in the example there are no regions requiring 3 unit memories. Therefore, the remaining three unit memories of the uppermost Row 4 for region $RG_2$ are filled with another region, namely region $RG_4$, that was size >3, where in the example illustrated the size is 9 unit memories. Note that for this allocation, a region of size ≤3 is not preferred, as it will not allow configurability consistent with the wiring layout of FIG. 6. Following this allocation, the process continues as described above to fill all rows of the layout, that is, in an attempt to optimize the use of the available unit memories in the pool P. Lastly, note that the preferred embodiment allocation methodology takes care to avoid the situation for the uppermost row where the last of the floating units from the region below, together with the region of size <W, do not fill the uppermost row.

As another criterion in the preferred embodiment allocation methodology, although not shown in FIG. 7, note that if there are K fewer regions $RG_x$ than rows, any K rows (other than the bottom row and a row with no overflow units from below) may skip having fixed units on them. For example in FIG. 8, there were 8 rows and 8 regions; if, however, there were only 6 regions, then there are K=2 fewer regions than rows, in which case two rows of the pool P may be skipped having fixed units on them in the allocation. In other words, any K rows can be filled fully with floating units from the region below.

As a final consideration for the preferred embodiment allocation methodology, note that if the total area of the memory unit pool P is not rectangular, the preferred embodiment is as before, but on each row, filling the row requires a different number of unit memories.

Given the preferred embodiment allocation methodology, and via the example of FIG. 8, one skilled in the art may now appreciate its consistency with the preferred embodiment configuration layout of FIG. 6. Particularly, with a maximum of two regions per row, unit memories on that row only belong to at most two statistics counters (or other logic units), and only two read words and two write words are required per such a row. With contiguous regions, and at most two per row, at most one region in a row may belong to a different (lower) home row, so there is one copy of vertical read data word wiring and one copy of vertical write data word wiring required. Note that floating units are always above their home row. As a result, in the vertical direction write data need only be broadcast up, not down, and read data need only flow down, not up. Accordingly, the preferred embodiments reduce the amount of vertical wiring and considerably versus certain alternative configurations (e.g., see, FIGS. 3 and 4).

If the number of statistics counters is larger than the number of rows, the algorithm extends as described here. For example, with 16 statistics counters in 8 rows, every row has two logic units and is the home row to two regions $RG_x$. In each row, at most one region $RG_x$ is not fully contained in the row. There can be at most three regions per row, the two for which this is the home row and one whose home row is below. In this case, with two home regions per row, one of the regions must be fully contained in the row. If that region is considered the additional region versus the base case with a total 8 statistics counters, then the implementation of FIG. 6 is extended by adding one logic unit to each row. That logic unit broadcasts write data only to its row and gets read data only from its row. It does not participate in any of the vertical multiplexing logic. The read and write wiring from this new logic unit adds one read data and one write data word to the horizontal wiring, producing a total of 3 copies each of read and write data words. In general, this can be extended to an architecture with M times as many statistics counters as rows. Every row has M logic blocks, all but one of which connect with read and write data only to that row (although note for different logic block types, all logic blocks connect with vertical wiring). There are M+1 copies each of read and write word data broadcast horizontally in the row. M copies of the read and write word wiring connect only to logic blocks on that row. One copy of read and write word wiring connects through multiplexing to the vertical wiring and other rows. Independent of M, there is only one vertical read word copy and one vertical write word copy, just as in FIG. 6, with the same vertical read and write multiplexing as in FIG. 6. The allocation methodology begins by assigning to each row pairs of regions that together fit exactly into a row. Then on the next row, a pair of regions are allocated, one of which overflows the row. On subsequent upper rows, pairs of regions are allocated which together are <W, with the remainder of the row filled with floating units from the lower row. At the uppermost row of a multi-row region, if the row cannot be exactly filled with a pair of additional regions with unit sizes that together add to <W (along with the floating unit memories from below), it is filled with a pair that together add to >W, with one of the pair overflowing into the next row up. If the number of statistics counters is not a multiple of the number of rows, but is between M times and M−1 times the number of rows, some rows get M home regions and others get M−1 home regions.

In a preferred embodiment, meter memories, and the newly-invented stateful memories, have a similar wiring issue to statistics memories, in that they have a read-modify-write operation so both read data and write data must be connected. The above scenario can be extended so that both statistics and meters (stateful memories too, but writing meters and stateful memories will be shortened for readability to just meters) contribute to the total number of regions to be allocated. If fully flexible allocation is required, where all unit memories could be meters, or all unit memories could be stateful memories, then the logic units are extended so they can programmably handle either function. If not all rows in the pool array can be meters, presumably some of the logic units could omit meter functionality; the same is true for statistics memories. The base logic block of FIG. 6 which can connect to rows above must contain functionality for both. If there is a certain number of rows K1 which could never be meters, meter logic can be omitted from K1−1 of the logic blocks (K1−1 rather than K1 because the base logic block may be the one which does not do meters). Likewise, if there are a certain number of rows K2 that could never be statistics memories, statistics logic can be omitted from K2−1 of the logic blocks. This allows merging the wiring of the two separate systems, statistics and meters, with a total of one extra horizontal read and write word, and a total of one vertical read and write word. This is more economical than building wiring for the two systems separately.

Any unit memories that can be configured as statistics memories have connections on their address and write data input ports and read data output port to the statistics increment and route logic. If unit memories are also configurable for match and/or action, the connections for statistics are just another multiplexed input to the memory, and the output to the memory is routed to the logic for all memory types, match, action or statistics.

Meters and stateful memories are similar to statistics in that they require read modify write operation. They will have attached logic on the address and write data input ports, and the read data output ports for performing correct meter or stateful memory operations. As with statistics, these connections for meters or stateful memories form another multiplexed input to address or write data input ports, and the read data output is connected to the meter or stateful memory logic, as it may be to other logic modules useful for other memory configurations such as match, action and statistics.

The higher level view, leaving behind logic implementation details, is that a pool P of unit memories exists and from that pool individual memory units can be assigned as desired to perform as any type of match, action, statistics, meters, and stateful memories. It is not necessary in some preferred embodiments that all unit memories be assignable to each type. Each type may have only some fraction of the total pool P of memories assignable to it, producing some savings in logic. For example, the preferred embodiments anticipate that half of the unit memories or less would be required to be configurable for statistics.

Earlier, it was discussed that a preferred embodiment match memory is 112 bits wide, and when configured as a one unit memory wide match, its data is allocated as follows:

TABLE 2

(match memory data, 112 b wide)

| Number of bits | Data provided |
| --- | --- |
| 64 b | Match data |
| 4 b | Field data |
| 4 b | Version valid |
| 18 b | Action address and size |
| 5 b | Instruction address |
| 9 b | Next table address |
| 8 b | ECC |
| 112 b | TOTAL bits |

It was stated that when, per certain preferred embodiments, two unit memories are concatenated, 168b of match data with 11 field-valid bits is possible, as detailed here:

TABLE 3

(match memory data, 224 b wide)

| Number of bits | Data provided |
| --- | --- |
| 168 b | Match data |
| 11 b | Field data |
| 4 b | Version valid |
| 18 b | Action address and size |
| 5 b | Instruction address |
| 9 b | Next table address |
| 9 b | ECC |
| 224 b | TOTAL bits |

Here, ECC is shared across two memories. When four units are combined, 10b ECC may be shared across all 4 memory units.

In addition to concatenating unit memories for purposes of reducing unused memory bits in certain instances, numerous preferred embodiments also endeavor to maximize the efficiency of packing match words into the available bits, including an inventive technique that reduces the number of overhead bits that are stored in an OpenFlow table memory. In this regard, overhead bits are defined as the action address and size, instruction address, and next table address. These bits are included in the match memory for each flow entry.

Some OpenFlow tables have limited function with that limitation giving rise to inefficiency in prior art use of overhead bits. For example, an IP table may always do the same actions for every entry: decrement TTL, set output port and queue, and set source and destination MAC addresses. The present inventors have observed, therefore, that in that case, the action instruction word referenced by all locations would be the same word. In a preferred embodiment, therefore, the action instruction address is stored once in a global register for the table, and removed from each table entry, as compared to the prior art. Note that while the action instruction would be identical for all entries, the action data (and therefore the action address and size) may differ for each entry, in order to provide individual values for output port, and source and destination MAC addresses.

Further, and comparable in some respects, some Open-Flow tables always specify the same next-table in all entries. The present inventors have observed, therefore, that in that case, the next-table is removed from the from each table entry and stored in a value external from the table, such as in a register global for the entire table, thereby avoiding the prior art practice of storing the next-table address in each flow entry.

The present inventors also have observed that a table might not have the same action instruction for all entries, but it might have a reduced number of possible instructions, such as two or four. In that case, rather than fully encoding the action instruction for each flow, the action instruction address contained in the flow entry could be reduced to only the number of bits needed to address all possible instructions for that table. Thus, in the example of two or four possible instructions, a number of bits in each flow can be reduced to a width of 1 or 2 bits, respectively, with those determining the least significant bits (LSBs) of the instruction address, while the most significant bits (MSBs) are contained outside of the table (e.g., in a global register for the table). In this way, the number of bits required in the flow entry for action instructions is determined by the number of possible instructions for the table. The preferred embodiment global information includes the register holding the global address, and another register specifying the bit boundary (i.e., number of LSBs taken from the flow entry), so that MSBs are taken from the global register and LSBs are taken from the flow entry. Thus, this bit boundary specifies the width of the flow entry value. While the flow entry value must be masked off to the length specified by the bit boundary, LSBs of the global register may be set to 0 so they do not have to be disabled. They may simply be logically Or'ed or added in. If the global register is added in and its LSBs are not set to 0, it functions like a base address into the instruction memory, with the flow entry values containing the address offset to be added to the base.

The present inventors also have observed that there may be a limited number of OpenFlow next-table addresses, but greater than a single such address as discussed above. In general, these will not be contiguous addresses, so a reduced width field cannot simply specify the LSBs of the next-table address. Instead, in a preferred embodiment a small next-table array stores the next-table address possibilities, addressed by a next-table field in the flow entry, which has a reduced number of bits compared with the full flexibility option of the prior art. The bitwidth of the next-table field in the flow entry is preferably held in an out-of-table storage resource, such as a configuration register for the table. As an example, while next-table nominally requires 9 bits, if there are 4 possible next-table addresses, a next-table array of size 4 could be configured to hold those values for the entire table, and it would be addressed by a next-table field in the flow entry, which has been reduced from 9 bits to 2 bits (i.e., 2 bits to address the array of size $2^2=4$). Other sizes are possible, such as a next-table array of size 8 addressed by a 3 bit next-table flow entry (i.e., 3 bits to address the array of size $3^2=8$). In this way, the number of bits required in the flow entry is determined by the number of possible next-table values.

The action memory address is nominally 18 bits, and combines an action size with address, as shown previously in Table 1. This allows an address space encompassing from 8 k full width entries to 128 k minimum width entries. If, in a preferred embodiment, a smaller number of entries is desired than that provided by the 18 bits, again an outside-the-table store may be used, such as a global register for a table, that can specify the MSBs of this address, along with the address bitwidth in the flow entry, so MSBs may be determined by the global register and LSBs by the flow entry. In this way, the number of bits required in the flow entry is determined by the number of possible actions addressed.

With similar intent, if the minimum size of all action entries addressed is larger than the minimum addressable size in Table 1 (which is ¹⁄₁₆th size), then the present inventors recognize that the table need not include a number of bits to describe all possible different sizes, down to the smallest size of ¹⁄₁₆. Instead, in a preferred embodiment, an out-of table store, such as a global register, specifies a value for LSBs of Table 1's addresses and the number of bits to get from this global register instead of from the flow entry value. This can be used to either set a minimum size or an exact size. For example, specifying the two LSBs of Table 1 as 00 implies that the size is ¼ or larger, while specifying the two LSBs of Table 1 as 10 sets the size as exactly ⅛ for all entries.

An additional preferred embodiment option can remove all action address overhead bits under certain conditions. If all actions are the same length, and there is exactly one unique action for every flow entry, there will be the same number of action entries as flow entries. In that case, there can be a direct mapping of flow entries to action entries and the address of the action can be specified by the address of the matching flow entry, so no action address bits need be contained in the flow entry. Similarly to above, a global register can specify the MSBs of the action addresses, or for each unit memory used as match, a register can specify the address MSBs for that portion of the flow table.

An additional preferred embodiment option can represent an action data value directly in flow table entries as an immediate constant by setting, as included in a preferred embodiment, an immediate-action flag in the flow table. For small bitwidth constants, this saves the overhead of the pointer, and represents the constant more efficiently than action memory, which is limited to a minimum data width of 40 bits. For example, if an action only sets the output port number, a 6 bit constant is sufficient for a 64 port switch. Representing this as an immediate constant is more efficient than an 18b pointer.

An additional preferred embodiment option optimizes the case where some or all of the action fields are common for an entire table. For example, in the case above where the action only sets the output port number, a 6b constant in the flow entry specifies the port number. If the action also sets the output queue, and the queue is identical for all entries, an out-of-table store (e.g., global register) contains action values, a table global action value, up to 8×104b, which are logically OR'ed or multiplexed into the action output word. In this case, it would hold the queue ID. This can be used even when no action memory access is required; the action memory data logically OR'ed with the table global action value would be zero.

Given the above, the preferred embodiment proposes numerous techniques wherein the required bitwidth of overhead fields can be adjusted based on the required function flexibility of the table. The logic circuitry to implement this can be easily designed by one skilled in the art. If a particular set of bits is configured as the overhead field in a flow entry word, shifters can extract the three different overhead data values from configurable positions in the overhead field area. Note that this extracting logic needs only one copy per match table (rather than for each unit memory) since it can be performed after matches are detected and the match unit memories' outputs are multiplexed together into a single output per table. Or equivalently, the extracting logic could be placed for each table output at every match unit memory, saving multiplexer wiring at the expense of more logic.

The overhead field, 32b from Table 2, can be located anywhere in the output data of a unit memory SRAM. There may be two candidate overhead fields per unit memory output word, where the second one only gets used when packing narrow fields together to yield more than one flow entry per unit memory word. The data input crossbar supplying match data to the match memories also can supply data to these fields. Any bits used for overhead would be masked off so they do not contribute to the address hash and do not participate in the equal comparison of RAM data output to search data generated by the crossbar. The location of overhead fields is arbitrary within the output word; they could even be in the middle of a set of bytes of matchable RAM data.

Field-valid bits may be included or optimized out. If field-valid bits are placed consecutively, for example, next to the overhead bits, configuration registers can specify for each whether it is to be included and can direct the packing of them into adjacent bits. Bits saved by not using individual field-valid bits may be used for match data or other overhead. For example, if a byte of field-valid bits is eliminated, an extra byte is available for match.

With narrow enough match data, and possibly sufficiently reduced overhead bits (e.g., by supplementing with out-of-table bits, using constants, etc.), two match entries can be packed into a single unit memory word. With two 32b IPV4 addresses and their associated 2×4b version valid bits, if each entry contains no more than 16b of overhead, two exact match entries can be packed into a single word.

Returning now to the preferred embodiment aspect of concatenating unit memories, recall again that variable numbers of entries also can be packed into multiple unit memories whose outputs are merged into a single wider word. Two unit memory SRAMs produce 215b of data after the 9b ECC is subtracted out, or four unit memory SRAMs produce 438b of data. For example, a standard TCP 5-tuple is 104b wide (2 32b IP addresses, 1 8b IP protocol, 2 16b TCP/UDP port numbers). Three of these can be packed into a four unit memory SRAM wide word with full 32b overhead. Overhead fields in three of the four unit memory outputs are used, whereas the 4th is unused and simply contributes to the number of available bits for match data. With a single bit of overhead per entry (equivalent to a pass/fail outcome), four TCP 5-tuple entries could be packed into the 438b available width of 4 concatenated SRAM words. Note that the 1b of overhead could be used for all three overhead fields: action instruction address, action data address, and next-table address, so two actions are possible differing in all aspects of behavior.

As another example, in an L2 switch, a 48b MAC destination field is used to look up an output port number. Three 48b MAC address fields plus their 6b output port numbers (an immediate constant action data) fit in a two unit memory SRAM wide output word (with 13 other overhead bits available per entry), or 7 of these fit in a four unit memory SRAM wide output word. In these examples, when unit memory outputs are combined/concatenated to make larger words, ECC can be applied across single SRAMs, pairs of SRAMs or larger groups, like across four SRAMs, up to the full larger word width. Some efficiency gain is achieved simply by losing a smaller fraction of total bitcount to ECC.

The summary of the above discussion is that efficiency is gained by reducing or eliminating overhead bits in cases where the number of choices for each overhead field is less than the number of possibilities implied by the bitwidth of the field. Efficiency is also gained by packing match entries together, as many as fit into either a single width word, or a wider word made by concatenating the outputs of multiple unit memory data output words.

An additional type of memory is sometimes required for ternary matching. Using exact match tables as an example, as described earlier, overhead bits exist for action address and size, instruction address, and next table address. For exact match tables, these add to the width of the flow entry, but for ternary tables, no such equivalent bits exist in the TCAM used for the table, so an additional memory, a ternary overhead memory, is added to hold those overhead bits. As with exact match memories, each overhead word can be up to 32b in width, and one overhead word must be provided for each TCAM flow entry. As with exact match memories, a number of preferred embodiment techniques may be implemented to reduce the bitwidth of that overhead word. One preferred embodiment configuration, described below, can eliminate it entirely, but otherwise, each field (action address and size, instruction address, and next table address) can be independently reduced in width with single bit granularity. In the limit, the overhead field can be reduced to a single bit, providing up to two options for action data, instructions, and next table. Depending on the width of the overhead field, a configurable number of overhead words can be fit into a memory word. Like the other memory types, this uses memories from the pool P of unit memories (e.g., 1 k word by 112b RAMs). At the full overhead width of 32b, three entries can be contained per word, while at the other extreme of 1b overhead width, up to 104 overhead entries can be contained in a memory word. With the example match stage configuration described above containing 2 k words of 640b TCAM, each word of which can be split into sixteen 40b words, a maximum of 32 k ternary flow entries are possible. With a single 1 k word unit memory SRAM allocated as the ternary overhead memory, there is no need to pack more than 32 entries into a word. With a maximum of 32 k ternary flow entries and the minimum of 3 flow entries per ternary overhead memory word, the maximum number of unit memory SRAMs that can be allocated to ternary overhead memory is 11. In the arrangement described above with 8 rows of unit memory SRAMs, only two columns of unit memory SRAMs would ever need to be considered for assignment to ternary overhead memories.

The one configuration, which for illustrative purposes does not require this additional memory, has individual action data of identical size for each TCAM flow entry. The TCAM addresses are then direct mapped to the action memory addresses, so for each TCAM unit memory, the MSBs of the action address are in a global register associated with that unit TCAM, and the LSBs of the action address come from the matching TCAM entry address. In this case, analogous to exact match table operation, no flow entry overhead bits are required to map the matching address to the action memory address. If the next-table address is the same for all table entries, it is in a preferred embodiment contained in a global register, and likewise, if the action instruction is identical for all entries, its address is also held globally. In that case, no overhead bits are required and no ternary overhead memory need be allocated.

Ternary overhead memories are like match and action memories in that they are written by software running on the CPU of controller 12. So the write data and write address logic that writes match and action memories also handles writing to ternary overhead memories without any additional hardware. Like match and action memories, if an ECC error occurs, the packet can be sent to controller 12, which will resubmit it after rewriting the offending memory location with correct data. The TCAM match address that will direct the outputting of the ternary overhead data becomes an additional multiplexer input at the address input port of RAMs which could be allocated as ternary overhead memories. The data outputs of these memories are connected to the logic that will control action instruction fetch, address action memory, and determine next-table, in addition to their connections required for other uses such as match, action, statistics and meters.

With ternary overhead memories also drawn from the pool of unit memory SRAMs, the preferred embodiment includes types of memories allocated from pool P to include match, action, statistics, meters, stateful, and ternary overhead.

From the above, various embodiments provide numerous improvements to network packet routing and more particularly to systems such as OpenFlow that provide for a match/action paradigm in packet analysis and routing. Various aspects have been described, and still others will be ascertainable by one skilled in the art from the present teachings. Still further, while various alternatives have been provided according to the disclosed embodiments, still others are contemplated and yet others can be ascertained by one skilled in the art. Given the preceding, therefore, one skilled in the art should further appreciate that while some embodiments have been described in detail, various substitutions, modifications or alterations can be made to the descriptions set forth above without departing from the inventive scope, as is defined by the following claims.

What is claimed is:

1. A packet processor, comprising: an input for receiving data in a packet header vector, the vector comprising data representing information for a packet;
   at least one match table, performing match operations between packet header vector data and the at least one match table, the at least one match table comprising a plurality of match entries, each of the match entries comprising an action memory pointer information field of variable bit width;
   an action memory;
   circuitry, responsive to the match operations, for performing actions that comprise modifying the packet header vector data, the actions requiring information in the action memory, wherein the action memory is addressed by an action memory pointer comprising a plurality of bits having an action memory pointer bit width;
   a global action pointer memory for storing a global action memory pointer, separate from the match table;
   a global action boundary memory for describing boundaries of a contiguous set of bits of the action memory pointer to be sourced from the action memory pointer information field;
   wherein the contiguous set of bits of the action memory pointer are sourced from the action memory pointer information field; and
   wherein bits other than the contiguous set of bits of the action memory pointer are sourced from the global action pointer memory.

2. The packet processor of claim 1 wherein the actions requiring information in the action memory require the inputting of action operands, the action operands comprising data constants stored in the action memory.

3. The packet processor of claim 2 and further comprising: memory for indicating a location and size of the action memory pointer information field in each of the match entries; and circuitry for extracting the action memory pointer information field from each of the match entries, responsive to the location and the size indicated by the memory.

4. The packet processor of claim 1 wherein the actions requiring information in the action memory require the inputting of action instructions, the action instructions stored in the action memory.

5. The packet processor of claim 4 and further comprising: memory for indicating a location and size of the action memory pointer information field in each of the match entries; and circuitry for extracting the action memory pointer information field from each of the match entries, responsive to the location and the size indicated by the memory.

6. The packet processor of claim 1 wherein the global action memory pointer has a bit width equal to the action memory pointer bit width.

7. A packet processor, comprising: an input for receiving data in a packet header vector, the vector comprising data values representing information for a packet; a plurality of match tables, performing match operations between packet header vector data values and a selected match table, each match table in the plurality of match tables comprising a plurality of match entries, each of the match entries comprising a next table data field;
   an action memory;
   circuitry, responsive to the match operations, for performing actions that comprise modifying the packet header vector data fields and specifying an address of a next match table for additional match operations;
   wherein each match table in the plurality of match tables is addressable by a signal of a first bit width;
   wherein the next match table is addressed by a next match table pointer comprising a plurality of bits and having a second bit width smaller than the first bit width;
   a next match table array containing a number of next match table addresses of bit width equal to the first bit width, wherein said next match table pointer bit width is a minimum of zero bits, wherein a maximum of said next match table pointer bit width is determined by the number of next match table addresses in the next match table array;
   wherein each next table data field has a bit width equal to the second bit width; and
   wherein upon a match in a match operation, an entry corresponding to the match provides a respective next table data field to the next match table pointer, the next match table pointer addressing the next match table array for outputting an address of a next match table to be for additional match operations.

8. The packet processor of claim 7 and further comprising: memory for indicating a location and size of the next match table data field in each of the match entries; and circuitry for extracting the next match table data field from each of the match entries, responsive to the location and the size indicated by the memory.

9. A packet processor, comprising: an input for receiving data in a packet header vector, the vector comprising data values representing information for a packet; at least one match table, performing match operations between packet header vector data values and entries in the at least one match table; an action memory; circuitry, responsive to the match operations, for performing actions that comprise modifying the packet header vector data fields; wherein the actions requiring the inputting of action operands; wherein the action operands comprising data constants stored in the action memory, wherein the match table comprising an immediate-action flag; wherein each of the entries comprises an action memory pointer data field; and wherein, when said immediate-action flag indicates true, data in the action memory pointer data field is interpreted as a data constant for the action operands rather than as a pointer to the action memory.

* * * * *